(12) United States Patent
Bienkowski et al.

(10) Patent No.: US 9,547,580 B1
(45) Date of Patent: *Jan. 17, 2017

(54) PROVIDING INTERMEDIATE RESULTS OF EVALUATING PROGRAM CODE THAT INCLUDES A COMPOUND STATEMENT

(71) Applicant: The MathWorks, Inc., Natick, MA (US)

(72) Inventors: Joseph R. Bienkowski, Ashland, MA (US); Claudia G. Wey, Wayland, MA (US); Michelle D. Erickson, Watertown, MA (US); Benjamin V. Hinkle, Brookline, MA (US); Jared D. MacDonald, Cambridge, MA (US); John E. Booker, Natick, MA (US); Joseph F. Hicklin, Wayland, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/746,112

(22) Filed: Jun. 22, 2015

Related U.S. Application Data

(63) Continuation of application No. 14/074,001, filed on Nov. 7, 2013, now Pat. No. 9,064,052, which is a (Continued)

(51) Int. Cl.
*G06F 9/44* (2006.01)
*G06F 11/36* (2006.01)

(52) U.S. Cl.
CPC ....... *G06F 11/3616* (2013.01); *G06F 11/3692* (2013.01)

(58) Field of Classification Search
CPC ....... G06F 11/30; G06F 11/38; G06F 11/3668; G06F 11/3664
(Continued)

(56) References Cited

U.S. PATENT DOCUMENTS

| | | |
|---|---|---|
| 5,317,740 A | 5/1994 | Sites |
| 5,339,428 A | 8/1994 | Burmeister et al. |

(Continued)

OTHER PUBLICATIONS

Eng, "Combining Static and Dynamic Data in Code Visualization", ACM, pp. 43-50, 2002.*

(Continued)

*Primary Examiner* — Anil Khatri
(74) *Attorney, Agent, or Firm* — Harrity & Harrity, LLP

(57) ABSTRACT

A device may receive an indication to evaluate a portion of program code. The device may cause the portion of program code to be evaluated based on receiving the indication to evaluate the portion of program code. The device may determine an intermediate result used to generate an overall result of evaluating the portion of program code based on causing the portion of program code to be evaluated. The intermediate result may be determined by evaluating a sub-portion of program code included in the portion of program code. The device may receive information that identifies a granularity level for displaying the intermediate result. The granularity level may indicate whether the intermediate result is to be provided for display. The device may selectively provide the intermediate result for display based on the granularity level.

20 Claims, 28 Drawing Sheets

Related U.S. Application Data continuation-in-part of application No. 14/059,872, filed on Oct. 22, 2013, now Pat. No. 9,053,235.

(58) Field of Classification Search
USPC .................................................. 717/123–129
See application file for complete search history.

(56) References Cited

U.S. PATENT DOCUMENTS

| | | | |
|---|---|---|---|
| 5,754,860 A | 5/1998 | McKeeman et al. | |
| 5,872,976 A * | 2/1999 | Yee .................... | G06F 11/3419 |
| | | | 714/47.1 |
| 6,202,199 B1 | 3/2001 | Wygodny et al. | |
| 6,263,489 B1 | 7/2001 | Olsen et al. | |
| 6,282,701 B1 | 8/2001 | Wygodny et al. | |
| 6,324,483 B1 * | 11/2001 | Sobel .................... | F02D 41/28 |
| | | | 702/104 |
| 6,915,509 B1 | 7/2005 | Chkodrov et al. | |
| 7,020,852 B2 | 3/2006 | Oeltjen et al. | |
| 7,055,140 B2 | 5/2006 | Bystricky | |
| 7,058,928 B2 | 6/2006 | Wygodny et al. | |
| 7,146,613 B2 | 12/2006 | Chauvel et al. | |
| 7,171,655 B2 | 1/2007 | Gordon et al. | |
| 7,302,675 B2 * | 11/2007 | Rogers ................ | G06F 11/3664 |
| | | | 714/E11.217 |
| 7,343,588 B2 | 3/2008 | Bates et al. | |
| 7,349,863 B1 * | 3/2008 | Pena-Mora ............ | G06Q 10/06 |
| | | | 700/108 |
| 7,496,906 B2 | 2/2009 | Black-Ziegelbein | |
| 7,519,952 B2 | 4/2009 | Bordawekar et al. | |
| 7,669,187 B2 * | 2/2010 | Liu .................... | G06F 11/3644 |
| | | | 712/227 |
| 7,669,188 B2 | 2/2010 | Nickell | |
| 7,685,570 B2 | 3/2010 | Draine et al. | |
| 7,917,894 B2 | 3/2011 | Chen et al. | |
| 8,079,019 B2 | 12/2011 | Lindo et al. | |
| 8,087,002 B2 * | 12/2011 | Fjeldstad ............ | G06F 11/3664 |
| | | | 717/124 |
| 8,104,021 B2 | 1/2012 | Erlingsson et al. | |
| 8,108,689 B2 * | 1/2012 | Nicolson ................ | G06F 21/14 |
| | | | 713/190 |
| 8,146,058 B2 | 3/2012 | Sarkar et al. | |
| 8,219,980 B2 * | 7/2012 | Bates .................. | G06F 11/3612 |
| | | | 717/124 |
| 8,296,738 B1 | 10/2012 | Kiel | |
| 8,312,435 B2 | 11/2012 | Wygodny et al. | |
| 8,365,149 B2 | 1/2013 | Frank et al. | |
| 8,365,286 B2 | 1/2013 | Poston | |
| 8,392,885 B2 | 3/2013 | Stall et al. | |
| 8,490,061 B2 * | 7/2013 | Chung .................... | G06F 8/443 |
| | | | 711/154 |
| 8,516,458 B2 * | 8/2013 | Stewart .................... | G06F 8/427 |
| | | | 717/141 |
| 8,593,703 B2 | 11/2013 | Kort | |
| 8,595,703 B2 * | 11/2013 | van Gogh ............ | G06F 11/3604 |
| | | | 714/38.1 |
| 8,601,442 B2 | 12/2013 | Shafi | |
| 8,627,287 B2 * | 1/2014 | Fanning .................... | G06F 8/75 |
| | | | 717/124 |
| 8,640,103 B2 * | 1/2014 | Sheppard ............ | G06F 11/3688 |
| | | | 717/125 |
| 8,656,351 B2 | 2/2014 | Kodosky et al. | |
| 8,745,594 B1 * | 6/2014 | Iossiphidis .......... | G06F 11/3688 |
| | | | 717/124 |
| 8,799,871 B2 | 8/2014 | Baker | |
| 8,839,204 B2 * | 9/2014 | Gounares .............. | G06F 8/4441 |
| | | | 717/124 |
| 8,863,085 B1 | 10/2014 | Stahlberg | |
| 8,887,138 B2 * | 11/2014 | Eker .................... | G06F 11/3664 |
| | | | 717/119 |
| 8,893,084 B2 | 11/2014 | Parker | |
| 8,935,673 B1 | 1/2015 | Ashkenazi | |
| 8,997,063 B2 * | 3/2015 | Krajec ................ | G06F 11/3636 |
| | | | 717/125 |
| 9,053,228 B1 | 6/2015 | Bienkowski et al. | |
| 9,053,235 B1 | 6/2015 | Bienkowski et al. | |
| 9,064,052 B1 | 6/2015 | Bienkowski et al. | |

OTHER PUBLICATIONS

Genz et al, "Overcoming Limitations of the SystemC Data Introspection", ACM, pp. 590-593, 2009.*

Ding et al, "A Compiler Scheme for Reusing Intermediate Computation Results", IEEE, pp. 1-12, 2004.*

Fontana et al, "Impact of Refactoring on Quality Code Evaluation", ACM, pp. 37-40, 2011.*

Zitser et al, "Testing Static Analysis Tools using Exploitable Buffer Overflows from Open Source Code ", ACM, pp. 97-106, 2012.*

Fontana et al, "Investigating the Impact of Code Smells Debt on Quality Code Evaluation", IEEE, pp. 15-22, 2012.*

Sinha et al, "Efficient Evaluation of Boolean Expressions", ACM, vol. 13, issue 12, pp. 88-97, 1978.*

Jiang et al, "Generalized Cofactoring for Logic Function Evaluation", ACM, pp. 155-158, 2003.*

Velicheti et al, "Towards Modeling the Behavior of Static Code Analysis Tools", ACM, pp. 17-20, 2014.*

DiGiuseppe, "Automatically Describing Software Faults", ACM, pp. 711-714, 2013.

Fontana et al., "Investigating the Impact of Code Smells Debt on Quality Code Evaluation", IEEE, pp. 15-22, 2012.

Ficco et al., "Bug Localization in Test-Driven Development", Hindawi Publishing Corporation, Advances in Software Engineering, vol. 2011, Article ID 492757, 2011, 18 pages.

Fontana et al., "Impact of Refactoring on Quality Code Evaluation", ACM, pp. 37-40, 2011.

Dyer et al., "A Decision Tree-based Approach to Dynamic Pointcut Evaluation", ACM, pp. 1-10, 2008.

Reps et al., "Intermediate-Representation Recovery from Low-Level Code", ACM, pp. 100-111, 2006.

Yin et al., "A Fine-Grained Debugger for Aspect-Oriented Programming", ACM, pp. 59-70, 2012.

* cited by examiner

TECHNICAL COMPUTING ENVIRONMENT (TCE)

File | Edit | Tools | View | Evaluate | Execute | Debug | Help

Code Editor Window

```
x = 10
y = 20
if (FuncX(x) > FuncY(y))
    disp('FuncX Wins!')
else
    disp('FuncY Wins!')
end
---------------------------------
FuncX(x)
    OutX = x + 18 / 3 * (2 + 2)
    return OutX
end
---------------------------------
FuncY(y)
    OutY = (90 + y / 2) / (2 + 3)
    return OutY
end
```

Code Evaluation Window x = 10
y = 20
FuncX Wins!      } 516

Granularity Level Options

Current Level = 1 ← 514

Adjust Granularity Level:

[-1] Next Coarser Level
[+1] Next Finer Level
     ↑
    518

FIG. 5D

Code Editor Window

```
x = 10
y = 20
if (FuncX(x) > FuncY(y))
    disp('FuncX Wins!')
else
    disp('FuncY Wins!')
end
------------------------------------
FuncX(x)
    OutX = x + 18 / 3 * (2 + 2)
    return OutX
end
------------------------------------
FuncY(y)
    OutY = (90 + y / 2) / (2 + 3)
    return OutY
end
```

Code Evaluation Window

```
x = 10
y = 20
TRUE: (FuncX(x) > FuncY(y))    } 522
FuncX Wins!
```

Granularity Level Options

Current Level = 2  ← 520

Adjust Granularity Level:

[-1]  [+1] ← 524

Next Coarser Level
Next Finer Level

FIG. 5E

Code Editor Window

```
x = 10
y = 20
if (FuncX(x) > FuncY(y))
    disp('FuncX Wins!')
else
    disp('FuncY Wins!')
end
----------------------------
FuncX(x)
    OutX = x + 18 / 3 * (2 + 2)
    return OutX
end
----------------------------
FuncY(y)
    OutY = (90 + y / 2) / (2 + 3)
    return OutY
end
```

Code Evaluation Window

```
x = 10
y = 20
TRUE: (FuncX(x) > FuncY(y))
      FuncX → 34
      FuncY → 20
FuncX Wins!
```

528

Granularity Level Options

Current Level = 3

Adjust Granularity Level:

[-1] Next Coarser Level
[+1] Next Finer Level

```
TECHNICAL COMPUTING ENVIRONMENT (TCE)                    _ ☐ ×
 File  Edit  Tools  View  Evaluate  Execute  Debug  Help ┌─ Code Editor Window ──────── _ ☐ × ─┬─ Code Evaluation Window ──── _ ☐ × ─┐
│ x = 10                              │ ⊠ x = 10                            │
│                                     │                                     │
│ y = 20                              │ ⊠ y = 20                            │
│                                     │                                     │
│ if (FuncX(x) > FuncY(y))            │ ⊟ TRUE: (FuncX(x) > FuncY(y))       │
│      disp('FuncX Wins!')            │                    ⊞ FuncX → 34     │
│ else                         530 →  │               532→ ⊞ FuncY → 20     │
│      disp('FuncY Wins!')     534 →  │ ⊠ FuncY Wins!                       │
│ end                                 │                                     │
│ ─ ─ ─ ─ ─ ─ ─ ─ ─ ─ ─ ─ ─           │                                     │
│ FuncX(x)                            │                                     │
│     OutX = x + 18 / 3 * (2 + 2)     │                                     │
│     return OutX                     │                                     │
│ end                                 │                                     │
│ ─ ─ ─ ─ ─ ─ ─ ─ ─ ─ ─ ─ ─           │                                     │
│ FuncY(y)                            │                                     │
│     OutY = (90 + y / 2) / (2 + 3)   │                                     │
│     return OutY                     │                                     │
│ end                                 │                                     │
└─────────────────────────────────────┴─────────────────────────────────────┘
500 ↗

TECHNICAL COMPUTING ENVIRONMENT (TCE)

File | Edit | Tools | View | Evaluate | Execute | Debug | Help

Code Editor Window

```
x = 10
y = 20
if (FuncX(x) > FuncY(y))
    disp('FuncX Wins!')
else
    disp('FuncY Wins!')
end
----------------------------------
FuncX(x)
    OutX = x + 18 / 3 * (2 + 2)
    return OutX
end
----------------------------------
FuncY(y)
    OutY = (90 + y / 2) / (2 + 3)
    return OutY
end
```

Code Evaluation Window

- x = 10
- y = 20
- TRUE: (FuncX(x) > FuncY(y))
  - + FuncX → 34
  - − FuncY → 20
- + OutY = 100 / 5    ← 538
- FuncX Wins!

536

500

TECHNICAL COMPUTING ENVIRONMENT (TCE)

File  Edit  Tools  View  Evaluate  Execute  Debug  Help

Code Editor Window

```
x = 10
y = 20
if (FuncX(x) > FuncY(y))
    disp('FuncX Wins!')
else
    disp('FuncY Wins!')
end
----------------------------
FuncX(x)
    OutX = x + 18 / 3 * (2 + 2)
    return OutX
end
----------------------------
FuncY(y)
    OutY = (90 + y / 2) / (2 + 3)
    return OutY
end
```

Code Evaluation Window

```
[X] x = 10
[X] y = 20
[-] TRUE: (FuncX(x) > FuncY(y))
    [+] FuncX → 34
    [-] FuncY → 20
        [+] OutY = (90 + 10) / 5
                   ‾‾‾‾‾‾‾‾‾
                      540
                        ↖
                         542
[X] FuncX Wins!
```

FIG. 5I

TECHNICAL COMPUTING ENVIRONMENT (TCE)

File  Edit  View  Tools  Evaluate  Execute  Debug  Help

Code Editor Window

```
x = 10
y = 20
if (FuncX(x) > FuncY(y))
    disp('FuncX Wins!')
else
    disp('FuncY Wins!')
end
------------------------------------
FuncX(x)
    OutX = x + 18 / 3 * (2 + 2)
    return OutX
end
------------------------------------
FuncY(y)
    OutY = (90 + y / 2) / (2 + 3)
    return OutY
end
```

Code Evaluation Window

☒ x = 10
☒ y = 20
☐ TRUE: (FuncX(x) > FuncY(y))
  ☐ FuncX → 34
  ☐ FuncY → 20
  ☐ OutY = (90 + 20 / 2) / 5   — 544
                     ☐ ← 546
☒ FuncX Wins!

TECHNICAL COMPUTING ENVIRONMENT (TCE)

File  Edit  Tools  View  Evaluate  Execute  Debug  Help

Code Editor Window

```
x = 10
y = 20
if (FuncX(x) > FuncY(y))
    disp('FuncX Wins!')
else
    disp('FuncY Wins!')
end
-----------------------------------
FuncX(x)
    OutX = x + 18 / 3 * (2 + 2)
    return OutX
end
-----------------------------------
FuncY(y)
    OutY = (90 + y / 2) / (2 + 3)
    return OutY
end
```

Code Evaluation Window

☒ x = 10

☒ y = 20

☐ TRUE: (FuncX(x) > FuncY(y))

⊞ FuncX → 34

⊟ FuncY → 20

☐ OutY =

A.  y / 2 = 10  ⎫

B.  90 + 10 = 100  ⎬ 552

C.  2 + 3 = 5  ⎪

D.  100 / 5 = 20  ⎭

☒ FuncX Wins!

Code Editor Window

```
x = 10
y = 'Hello'  ———564
if (FuncX(x) > FuncY(y))
    disp('FuncX Wins!')
else
    disp('FuncY Wins!')
end
----------------------------------
FuncX(x)
    OutX = x + 18 / 3 * (2 + 2)
    return OutX
end
----------------------------------
FuncY(y)
    OutY = (90 + y / 2) / (2 + 3)
    return OutY
end
```

Code Evaluation Window x = 10 y = 'Hello'

- ERROR – Invalid value of FuncY ——566

[+] FuncX → 34

[-] FuncY → ERROR

[ OutY ] =

A. 'Hello' / 2 = ERROR

B. 90 + ERROR = ERROR

570→ C. 2 + 3 = 5

D. ERROR / 5 = ERROR

FuncX Wins!

FIG. 7A

TECHNICAL COMPUTING ENVIRONMENT (TCE)

File  Edit  Tools  View  Evaluate  Execute  Debug  Help

Code Editor Window

```
x = 10
y = 20
if (FuncX(x) > FuncY(y))         ← 710
    disp('FuncX Wins!')
else
    disp('FuncY Wins!')
end
-------------------------------
FuncX(x)
    OutX = x + 18 / 3 * (2 + 2)
    return OutX
end
-------------------------------
FuncY(y)
    OutY = (90 + y / 2) / (2 + 3)
    return OutY
end
```

Code Evaluation Window x = 10 y = 20

TRUE: (FuncX(x) > FuncY(y))    ← 705

FuncX → 34

FuncY → 20

OutY =

A. y / 2 = 10

B. 90 + 10 = 100

C. 2 + 3 = 5

D. 100 / 5 = 20

FuncX Wins!

700

TECHNICAL COMPUTING ENVIRONMENT (TCE)

File  Edit  Tools  View  Evaluate  Execute  Debug  Help

Code Editor Window

```
x = 10
y = 20
if (FuncX(x) > FuncY(y))
    disp('FuncX Wins!')
else
    disp('FuncY Wins!')
end
----------------------------------
FuncX(x)
    OutX = x + 18 / 3 * (2 + 2)
    return OutX
end
----------------------------------
FuncY(y)
    OutY = (90 + y / 2) / (2 + 3)
    return OutY
end
```

720

Code Evaluation Window x = 10
y = 20

[+] TRUE: (FuncX(x) > FuncY(y))

[+] FuncX → 34

[−] FuncY → 20  ← 715
  [−] OutY =

A.  y / 2 = 10
  B.  90 + 10 = 100
  C.  2 + 3 = 5
  D.  100 / 5 = 20

[X] FuncX Wins!

FIG. 7B

TECHNICAL COMPUTING ENVIRONMENT (TCE)

File   Edit   Tools   View   Evaluate   Execute   Debug   Help

Code Editor Window

```
x = 10
y = 20
if (FuncX(x) > FuncY(y))
    disp('FuncX Wins!')
else
    disp('FuncY Wins!')
end
-----------------------------
FuncX(x)
    OutX = x + 18 / 3 * (2 + 2)
    return OutX
end
-----------------------------
FuncY(y)
    OutY = (90 + y / 2) / (2 + 3)   ← 730
    return OutY
end
```

Code Evaluation Window x = 10
y = 20

[-] TRUE: (FuncX(x) > FuncY(y))
  [+] FuncX → 34
  [-] FuncY → 20
    [-] OutY =
        A. y / 2 = 10   ← 725
        B. 90 + 0 = 100
        C. 2 + 3 = 5
        D. 100 / 5 = 20

FuncY Wins!

TECHNICAL COMPUTING ENVIRONMENT (TCE)

File  Edit  Tools  View  Evaluate  Execute  Debug  Help

Code Editor Window

```
x = 10
y = 20
if (FuncX(x) > FuncY(y))
    disp('FuncX Wins!')
else
    disp('FuncY Wins!')
end
-----------------------------------
FuncX(x)
    OutX = x + 18 / 3 * (2 + 2)
    return OutX
end
-----------------------------------
FuncY(y)
    OutY = (90 + y / 2) / (2 + 3)   ← 740
    return OutY
end
```

Code Evaluation Window x = 10
y = 20

[−] TRUE: (FuncX(x) > FuncY(y))

[+] FuncX → 34

[−] FuncY → 20

[−] OutY =

A. y / 2 = 10
      B. 90 + 10 = 100
      C. 2 + 3 = 5
      D. 100 / 5 = 20   ← 735

[X] FuncX Wins!

TECHNICAL COMPUTING ENVIRONMENT (TCE)

File  Edit  Tools  View  Evaluate  Execute  Debug  Help

Code Editor Window

```
x = 10
y = 20
if (FuncX(x) > FuncY(y))
    disp('FuncX Wins!')
else
    disp('FuncY Wins!')
end
-----------------------------------
FuncX(x)
    OutX = x + 18 / 3 * (2 + 2)
    return OutX
end
-----------------------------------
FuncY(y)
    OutY = (90 + y / 2) / (2 + 3)    ← 745
    return OutY
end
```

Code Evaluation Window x = 10 y = 20

TRUE: (FuncX(x) > FuncY(y))

[+] FuncX → 34

[−] FuncY → 20

OutY =
　　A.　y / 2 = 10
　　B.　90 + 10 = 100
　　C.　2 + 3 = 5
　　D.　100 / 5 = 20    ← 750

FuncY Wins!

FIG. 7E

```
TECHNICAL COMPUTING ENVIRONMENT (TCE)                    [_][□][X]
File  Edit  Tools  View  Evaluate  Execute  Debug  Help Code Editor Window                               [_][□][X]

x = 10
y = 20
if (FuncX(x) > FuncY(y))
    disp('FuncX Wins!')
else
    disp('FuncY Wins!')
end
----------------------------------------
FuncX(x)
    OutX = x + 18 / 3 * (2 + 2)
    return OutX
end
----------------------------------------
FuncY(y)
    OutY = (90 + y / 2) / (2 + 3)
    returnOutY
end
```

```
Code Evaluation Window                           [_][□][X]

[X] x = 10
[X] y = 20
[-] TRUE: (FuncX(x) > FuncY(y))
    [+] FuncX → 34
    [-] FuncY → 20
        [-] OutY =
            A. y / 2 = 10
            B. 90 + 10 = 100
            C. 2 + 3 = 5
            D. 100 / 5 = 20
[X] FuncY Wins!
```

FIG. 7F

PROVIDING INTERMEDIATE RESULTS OF EVALUATING PROGRAM CODE THAT INCLUDES A COMPOUND STATEMENT

RELATED APPLICATION

This application is a continuation of U.S. patent application Ser. No. 14/074,001, (now U.S. Pat. No. 9,064,052) which is a continuation-in-part (CIP) of U.S. patent application Ser. No. 14/059,872, filed on Oct. 22, 2013, (now U.S. Pat. No. 9,053,235) the contents of which are incorporated by reference herein in their entirety.

BRIEF DESCRIPTION OF THE DRAWINGS

FIGS. 7A-7F are diagrams of an example implementation relating to the example process shown in FIG. 6.

DETAILED DESCRIPTION

The following detailed description of example implementations refers to the accompanying drawings. The same reference numbers in different drawings may identify the same or similar elements.

A user, such as a computer programmer, may create program code, and may cause a client device to evaluate the program code and display a result of evaluating the program code. The client device may only output an overall result of evaluating the entire program code, or may only output overall results of evaluating a block of program code, without outputting intermediate results. The client device may perform multiple intermediate operations (e.g., processing steps) to generate intermediate results that are used to determine an overall result. The user may wish to view these intermediate results, and may wish to view a correspondence between the intermediate results and a corresponding portion of program code used to generate the intermediate results. For example, the user may wish to view this correspondence to understand how a program operates step-by-step, to check a program for errors, to get help with a particular portion of program code, or the like. Implementations described herein allow a user to view such correspondence between program code and intermediate program code evaluation results, thereby enhancing the user's knowledge of how the program code operates.

Figure 1A:
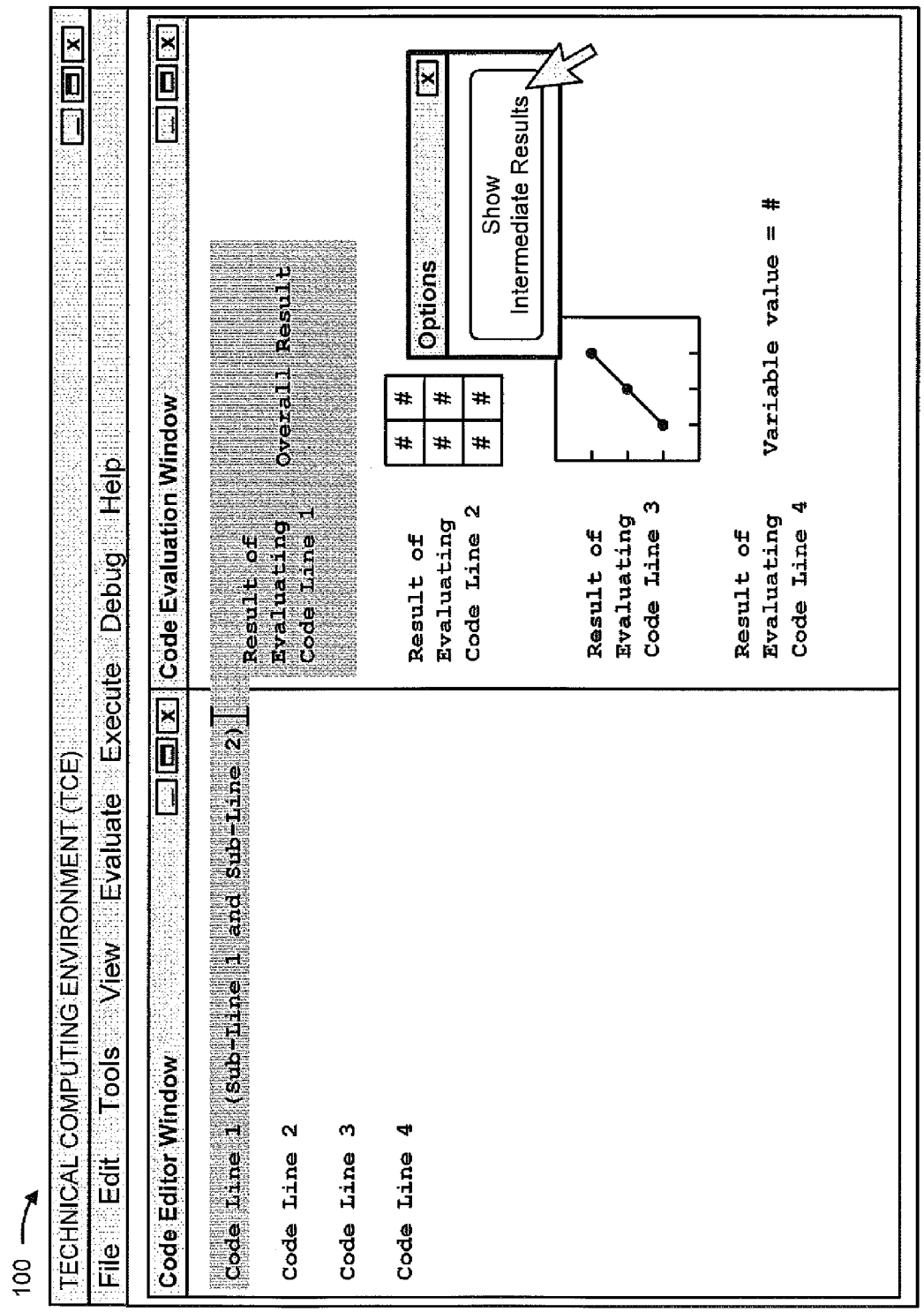
FIGS. 1A and 1B are diagrams of an overview of an example implementation described herein.
Figure 1B:
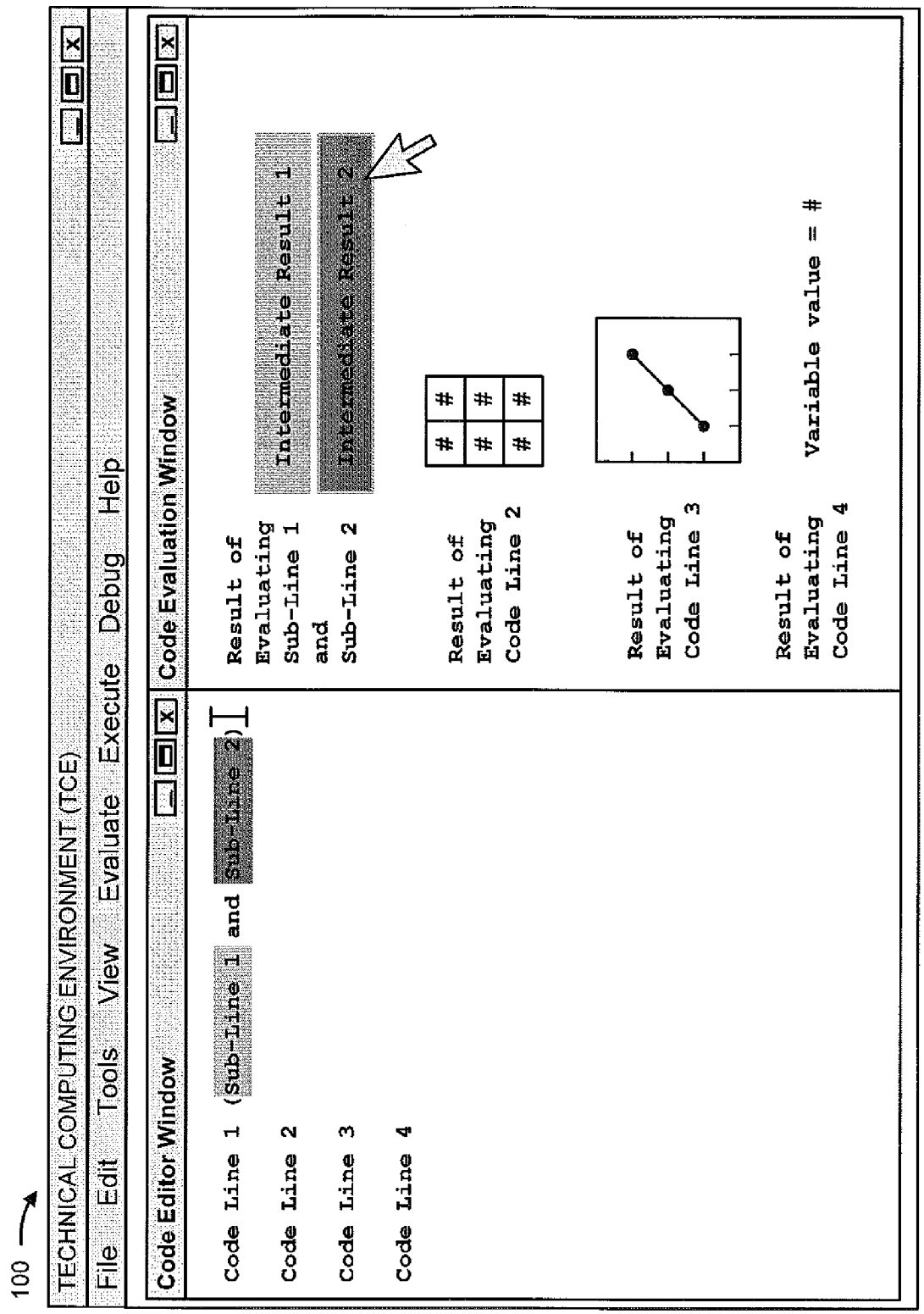

FIGS. 1A and 1B are diagrams of an overview of an example implementation 100 described herein. As shown in FIG. 1A, a technical computing environment (TCE), such as a TCE running on a client device, may provide a code editor window that permits a user to input and/or view program code. The TCE may also provide a code evaluation window that provides results of evaluating different portions of the program code. The user may interact with an input mechanism, such as an "Evaluate" button provided via the TCE. Based on the user interaction, the client device may evaluate the program code provided in the code editor window, and may display results of evaluating the program code in the code evaluation window.

As further shown in FIG. 1A, a portion of program code (e.g., shown as "Code Line 1") may include multiple sub-portions of program code (e.g., shown as "Sub-Line 1" and "Sub-Line 2"). The client device may evaluate the sub-portions (e.g., portions of a line of code) to generate intermediate results, and may use the intermediate results to generate an overall result of evaluating the portion of program code (e.g., a line of code). The client device may provide the overall result, and may provide a correspondence indicator that indicates a correspondence between the overall result and the portion of program code. As shown, assume that the user interacts with an input mechanism to indicate a desire to view intermediate results (e.g., via a "Show Intermediate Results" button).

As shown in FIG. 1B, based on the user interaction, the client device may provide the intermediate results, generated by evaluating the sub-portions of program code. As further shown, the client device may provide multiple correspondence indicators that indicate a correspondence between an intermediate result and a respective sub-portion of program code used to generate the intermediate result. For example, the client device may provide a first correspondence indicator (e.g., shown in light gray) to indicate a correspondence between Sub-Line 1 and Intermediate Result 1, and may provide a second correspondence indicator (e.g., shown in dark gray) to indicate a correspondence between Sub-Line 2 and Intermediate Result 2. In this way, a user may be able to easily determine which portion of code produced which result, thus aiding the user in understanding how a program operates step-by-step, checking a program for errors, or the like.

Figure 2:
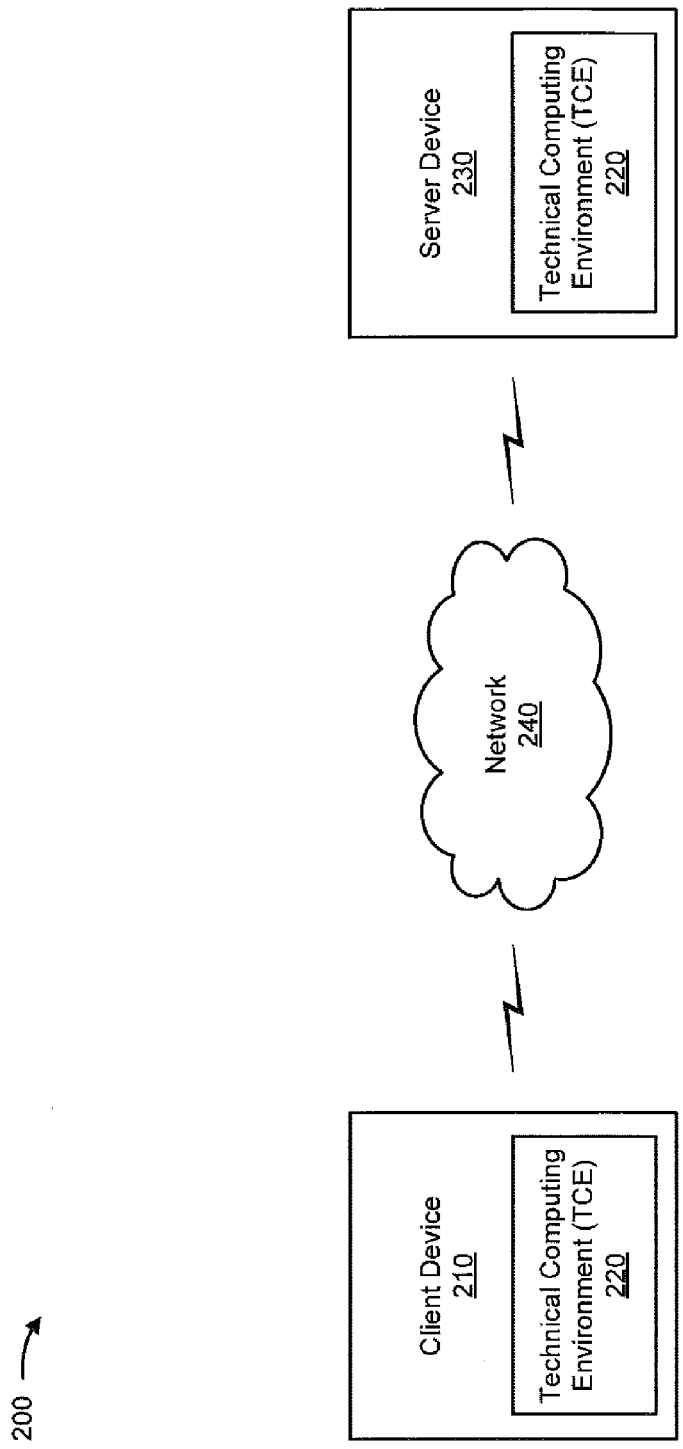
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, which may include a technical computing environment (TCE) 220. Furthermore, environment 200 may include a server device 230, which may include TCE 220, and a network 240. Devices of environment 200 may interconnect via wired connections, wireless connections, or a combination of wired and wireless connections.

Client device 210 may include one or more devices capable of receiving, generating, storing, evaluating, and/or providing program code and/or information associated with program code (e.g., a result of evaluating program code). For example, client device 210 may include a computing device, such as a desktop computer, a laptop computer, a tablet computer, a handheld computer, a server, a mobile phone (e.g., a smart phone, a radiotelephone, etc.), or a similar device. Client device 210 may evaluate program code by, for example, executing the program code, determining an error associated with the program code (e.g., by validating the program code, debugging the program code, etc.), determining information associated with the program code (e.g., determining help information associated with the program code), or the like. In some implementations, client device 210 may receive information from and/or transmit information to server device 230 (e.g., program code and/or information associated with program code).

Client device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may include a text-based environment (e.g., MATLAB® software), a graphically-based environment (e.g., Simulink® software, Stateflow® software, SimEvents® software, etc., by The MathWorks, Inc.; VisSim by Visual Solutions; LabView® by National Instruments; Agilent VEE by Agilent Technologies; Advanced Design System (ADS) by Agilent Technologies; Agilent Ptolemy by Agilent Technologies; etc.), or another type of environment, such as a hybrid environment that may include, for example, a text-based environment and a graphically-based environment.

TCE 220 may include, for example, a user interface that provides a code editor portion that permits a user to input program code (e.g., textual program code, graphical program code, etc.). Additionally, or alternatively, TCE 220 may include a user interface that provides a code evaluation portion that provides results corresponding to program code displayed in the code editor portion. TCE 220 may provide one or more correspondence indicators that indicate a correspondence between different portions of program code and respective results associated with the different portions of program code. TCE 220 may permit a user to input one or more configuration parameters that may control, for example, a manner in which a result is displayed and/or provided, a manner in which program code is displayed and/or provided, a manner in which a correspondence indicator is displayed and/or provided, or the like.

Server device 230 may include one or more devices capable of receiving, generating, storing, evaluating, and/or providing program code and/or information associated with program code. For example, server device 230 may include a computing device, such as a server, a desktop computer, a laptop computer, a tablet computer, a handheld computer, a mobile device, or a similar device. In some implementations, server device 230 may host TCE 220. In some implementations, client device 210 may be used to access one or more TCEs 220 running on one or more server devices 230. For example, multiple server devices 230 may be used to evaluate program code (e.g., serially or in parallel) and may provide respective results of evaluating the program code to client device 210.

In some implementations, client device 210 and server device 230 may be owned by different entities. For example, an end user may own client device 210, and a third party may own server device 230. In some implementations, server device 230 may include a device operating in a cloud computing environment. In this way, front-end applications (e.g., a user interface) may be separated from back-end applications (e.g., program code execution).

Network 240 may include one or more wired and/or wireless networks. For example, network 240 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

The number of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
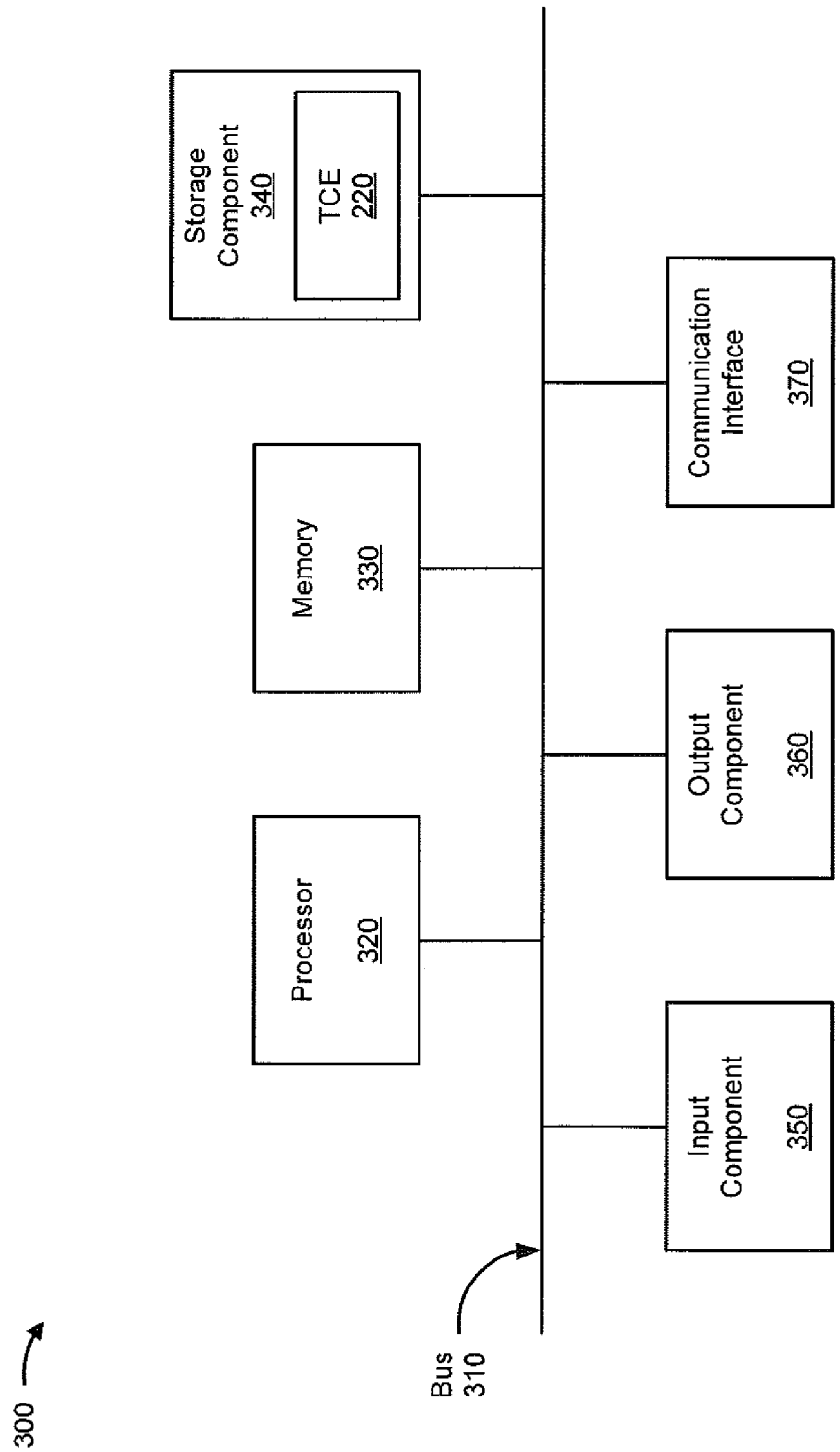
FIG. 3 is a diagram of example components of one or more devices of FIG. 2.

FIG. 3 is a diagram of example components of a device 300, which may correspond to client device 210 and/or server device 230. In some implementations, client device 210 and/or server device 230 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit, a graphics processing unit, an accelerated processing unit, etc.), a microprocessor, a microcontroller, and/or any processing component (e.g., a field-programmable gate array (FPGA), an application-specific integrated circuit (ASIC), an Arduino microcontroller, etc.) that interprets and/or executes instructions (e.g., according to an instruction set architecture, such as ARM, x86, etc.), and/or that is designed to implement one or more computing tasks. In some implementations, processor 320 may include multiple processor cores for parallel computing. Memory 330 may include a random access memory (RAM), a read only memory (ROM), and/or another type of dynamic or static storage component (e.g., a flash, magnetic, or optical memory) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits a user to input information to device 300 (e.g., a touch screen display, a keyboard, a keypad, a mouse, a button, a switch, etc.). Output component 360 may include a component that outputs information from device 300 (e.g., a display, a speaker, one or more light-emitting diodes (LEDs), etc.).

Communication interface 370 may include a transceiver-like component, such as a transceiver and/or a separate receiver and transmitter, that enables device 300 to communicate with other devices, such as via a wired connection, a wireless connection, or a combination of wired and wireless connections. For example, communication interface 370 may include an Ethernet interface, an optical interface, a coaxial interface, an infrared interface, a radio frequency (RF) interface, a universal serial bus (USB) interface, a high-definition multimedia interface (HDMI), or the like.

Device 300 may perform one or more processes described herein. Device 300 may perform these processes in response to processor 320 executing software instructions included in a computer-readable medium, such as memory 330 and/or storage component 340. A computer-readable medium may be defined as a non-transitory memory device. A memory device may include memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided as an example. In practice, device 300 may include additional components, fewer components, different components, or differently arranged components than those shown in FIG. 3. Additionally, or alternatively, one or more components of device 300 may perform one or more functions described as being performed by another one or more components of device 300.

Figure 4:
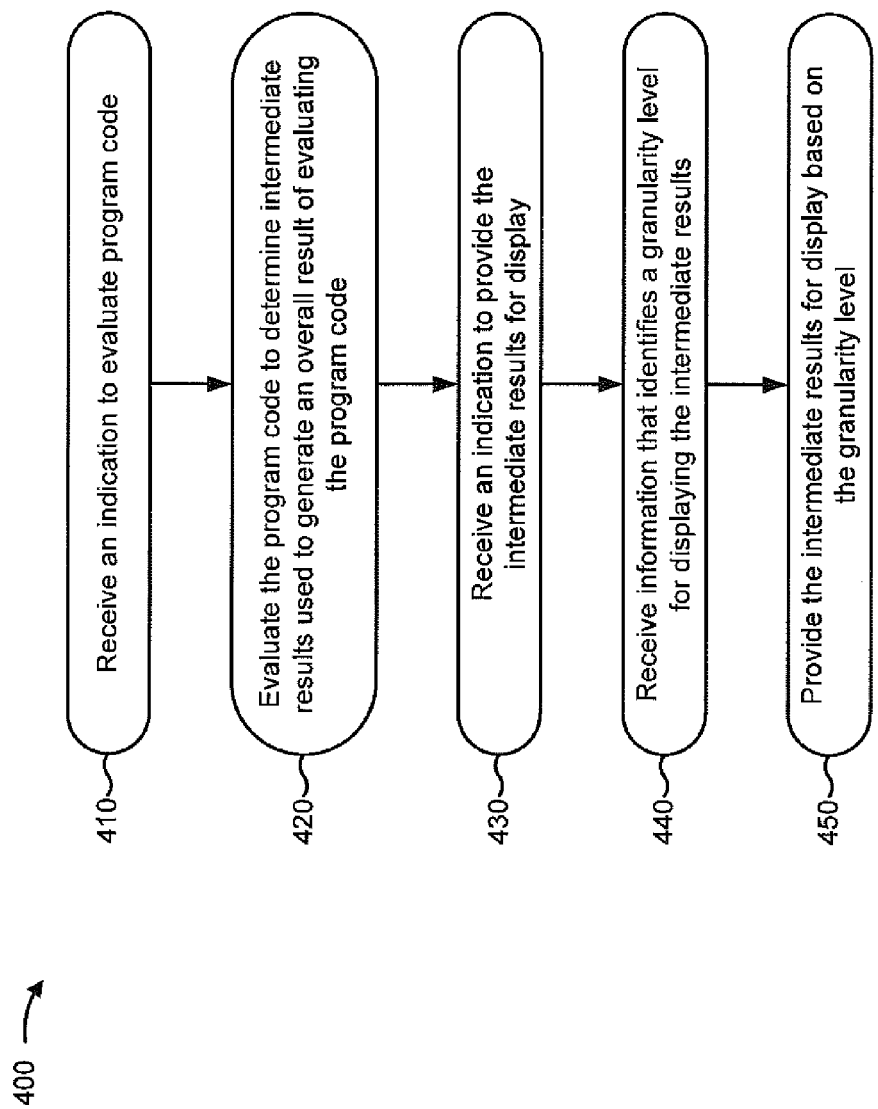
FIG. 4 is a flow chart of an example process for providing intermediate results of evaluating program code that includes a compound statement.

FIG. 4 is a flow chart of an example process 400 for providing intermediate results of evaluating program code that includes a compound statement. In some implementations, one or more process blocks of FIG. 4 may be performed by client device 210. In some implementations, one or more process blocks of FIG. 4 may be performed by another device or a group of devices separate from or including client device 210, such as server device 230.

As shown in FIG. 4, process 400 may include receiving an indication to evaluate program code (block 410). For example, client device 210 may receive (e.g., based on user input) an indication to evaluate program code (e.g., an evaluation indicator) provided via a code editor window of a user interface (e.g., program code provided via TCE 220). Client device 210 may receive the evaluation indicator based on a user interaction with a user interface of TCE 220, in some implementations. For example, a user may interact with an input mechanism (e.g., a menu item, a button, a tool bar item, a gesture, an interaction with a touch screen, etc.) to provide the evaluation indicator to client device 210.

Program code (sometimes referred to herein as code) may be broadly interpreted to include text-based code that may not require further processing to execute (e.g., C++ code, Hardware Description Language (HDL) code, very-high-speed integrated circuits (VHSIC) HDL (VHDL) code, Verilog™ code, Java™ code, another type of hardware and/or software based code that may be compiled and/or synthesized, etc.), binary code that may be executed (e.g., executable files that may be directly executed by an operating system, bitstream files that may be used to configure an FPGA, Java™ byte code, object files combined together with linker directives, source code, makefiles, etc.), text files that may be executed in conjunction with other executables (e.g., Python™ text files, Octave™ files, a collection of dynamic-link library (DLL) files with text-based combining, configuration information that connects pre-compiled modules, an extensible markup language (XML) file describing module linkage, etc.), source code (e.g., readable by a human), machine code (e.g., readable by a machine), or the like.

In some implementations, program code may include different combinations of the above-identified classes of code (e.g., text-based code, binary code, text files, source code, machine code, etc.). Additionally, or alternatively, program code may include code generated using a dynamically-typed programming language (e.g., the M language, a MATLAB® language, a MATLAB-compatible language, a MATLAB-like language, etc.) that may be used to express problems and/or solutions using mathematical notations. Additionally, or alternatively, program code may be of any type, such as a function, a script, an object, etc.

In some implementations, the evaluation indicator may include an indication to evaluate all of the program code provided via the code editor window. In some implementations, the evaluation indicator may include an indication to evaluate a portion and/or a sub-portion of the program code provided via the code editor window. A portion of program code (sometimes referred to herein as a program code portion) may refer to a portion of a program, such as one or more lines of program code, a string of one or more characters of program code, a set of strings of program code, a block of program code, a function, a method, a script, an object, or the like.

Additionally, or alternatively, the evaluation indicator may identify an evaluation mode. The evaluation mode may include an execute mode for evaluating executable program code (e.g., program code without errors), a debug mode for evaluating the program code for errors, a help mode for evaluating the program code to provide help information associated with the program code, and/or another mode.

As further shown in FIG. 4, process 420 may include evaluating the program code to determine intermediate results used to generate an overall result of evaluating the program code (block 420). For example, client device 210 may evaluate the program code based on receiving the indication to evaluate the program code. Additionally, or alternatively, client device 210 may cause the program code to be evaluated by client device 210 and/or one or more server devices 230, such as by providing the program code for evaluation and receiving one or more results generated based on evaluating the program code.

In some implementations, client device 210 may provide information identifying one or more portions of program code to one or more server devices 230 for evaluation (e.g., serially or in parallel). For example, client device 210 may run a browser for receiving input to be provided to server device(s) 230 and/or for displaying information received from server device(s) 230. Server device(s) 230 may evaluate the portion(s) of program code, and may provide one or more respective results of evaluating the portion(s) of program code to client device 210. Client device 210 and/or server device 230 may break the code into portions (e.g., based on the dependencies), and may evaluate different portions of the code serially and/or in parallel.

In some implementations, client device 210 may interact with a scheduler (e.g., local to client device 210 or remote from client device 210) that schedules one or more portions of program code for execution by one or more remote processors. The remote processors may be included in one or more server devices 230. The scheduler may determine a quantity of processors to use to execute program code based on the complexity of the program code and/or a quantity of program code portions that are to be executed (e.g., a quantity of program code portions that a user identifies or selects for execution).

In some implementations, client device 210 may determine intermediate results used to generate the overall result. For example, client device 210 may determine multiple intermediate results, generated by evaluating multiple respective sub-portions of program code, that are used to generate an overall result, associated with a portion of program code. The portion of program code may include the multiple sub-portions of program code.

Client device 210 may determine an overall result associated with evaluating a portion of program code. In some implementations, the overall result may be generated based on evaluating multiple sub-portions of program code to determine multiple intermediate results. The intermediate results may be processed to determine the overall result. For example, a line of code may include multiple strings of code that are evaluated independently before being processed together to determine an overall result for the line of code. As another example, a block of code (e.g., a function, a method, etc.) may include multiple lines of code, a program may include multiple files that include code, a conditional statement may include multiple sub-portions of code, a loop may include multiple sub-portions of code, etc.

In some implementations, an intermediate result may include an intermediate operation (e.g., a mathematical operation, a calculation, etc.) and/or a result of performing the intermediate operation. Additionally, or alternatively, an intermediate result may include an intermediate error (e.g., when a portion of code evaluates to an error).

Client device 210 may evaluate the program code based on one or more selected evaluation modes, in some implementations. Example evaluation modes include an execute mode, a debug mode, and a help mode. In some implementations (e.g., when the execute mode is specified), client device 210 may evaluate the program code by executing the program code. Additionally, or alternatively (e.g., when the debug mode is specified), client device 210 may evaluate the program code by determining one or more errors associated with the program code (e.g., by determining one or more portions of program code that fail to execute). Additionally, or alternatively (e.g., when the help mode is specified), client device 210 may evaluate the program code by determining to provide help information associated with the program code.

As further shown in FIG. 4, process 400 may include receiving an indication to provide the intermediate results for display (block 430). For example, client device 210 may receive an indication to provide the intermediate results for display, such as by receiving a display indictor. In some implementations, client device 210 may receive the display indicator based on evaluating the program code. Additionally, or alternatively, client device 210 may detect a user interaction with an input mechanism (e.g., a button, a link, a menu item, etc.), and may provide the intermediate results for display based on detecting the user interaction with the input mechanism.

In some implementations, the display indicator may identify one or more portions of program code (e.g., portions, sub-portions, etc.) for which intermediate results are to be displayed. For example, a user may select one or more portions of program code, and may interact with an input mechanism that causes client device 210 to provide intermediate results associated with the selected portions of program code.

As further shown in FIG. 4, process 400 may include receiving information that identifies a granularity level for displaying the intermediate results (block 440), and providing the intermediate results for display based on the granularity level (block 450). For example, client device 210 may receive (e.g., from a user, from a memory location, from another device, etc.) information that identifies a granularity level for displaying intermediate results. The granularity level may be associated with all of the program code or a portion of the program code (e.g., one or more selected portions of program code).

The granularity level may control a manner in which intermediate results are provided for display. For example, a coarser granularity level may provide fewer intermediate results than a finer granularity level. Thus, client device 210 may provide a greater quantity of results (e.g., intermediate results) for display when a finer granularity level is selected than when a coarser granularity level is selected. Similarly, client device 210 may provide a lesser quantity of results (e.g., intermediate results) for display when a coarser granularity level is selected than when a finer granularity level is selected. For example, when a coarse granularity level is selected, client device 210 may provide an overall result of evaluating a compound statement. When a finer granularity level is selected, client device 210 may provide multiple intermediate results generated by evaluating sub-portions of the compound statement.

In some implementations, client device 210 may determine the granularity level based on information stored in memory (e.g., in client device 210 and/or server device 230). For example, client device 210 may store a user-preferred granularity level (e.g., based on user input), a default granularity level (e.g., associated with a particular type of program code, such as a conditional statement, a loop, etc.), or the like.

Additionally, or alternatively, client device 210 may determine the granularity level based on user input. For example, client device 210 may provide a mechanism for a user to select a granularity level, such as a program level granularity, a block level granularity, a line level granularity, a sub-line level granularity, or the like. When the program level granularity is selected, an overall result of evaluating the entire program (e.g., all of the program code) may be provided for display. When the block level granularity is selected, results of evaluating separate blocks of code may be provided for display. When the line level granularity is selected, results of evaluating separate lines of program code may be provided for display. When the sub-line level of granularity is selected, results of evaluating separate sub-lines of program code (e.g., character strings on the same line of code) may be provided for display. These granularity levels are provided as an example, and client device 210 may provide other possible granularity levels for selection by the user.

As another example, client device 210 may provide a mechanism for a user to select to display results according to a next-coarser or a next-finer granularity level. In some implementations, client device 210 may determine an order of processing steps used to generate an overall result, and the intermediate results associated with each processing step. When the user selects to display intermediate results at a next-finer granularity level, client device 210 may step backward through the processing steps to determine intermediate results used in a prior step, and may provide the intermediate results for display. When providing the next-finer intermediate results, client device 210 may remove the next-coarser intermediate results from display, or may continue to provide the next-coarser intermediate results for display. Similarly, when the user selects to display intermediate results at a next-coarser granularity level, client device 210 may step forward through the processing steps to determine intermediate results used in a next step, and may provide the intermediate results for display. When providing the next-coarser intermediate results, client device 210 may remove the next-finer intermediate results from display, or may continue to provide the next-finer intermediate results for display. In some implementations, client device 210 may provide information identifying the processing steps based on the granularity level.

Additionally, or alternatively, client device 210 may provide a mechanism for a user to expand a particular result to display intermediate results (e.g., next-finer intermediate results) used to determine the particular result. Similarly, client device 210 may provide a mechanism for a user to collapse a particular result to hide intermediate results and/or to provide next-coarser results used to determine the particular result.

In some implementations, client device 210 may provide a coarsest level indicator associated with a result when the result cannot be modified to show a coarser result (e.g., when the result is the coarsest result, such as a coarsest result associated with an entire program, a block of code, a line of code, etc.). Similarly, client device 210 may provide a finest level indicator associated with a result when the result cannot be modified to show a finer result (e.g., when the result is the finest result and cannot be broken down into any more intermediate results for display).

In some implementations, client device 210 may provide an indication of a relationship (e.g., a relationship indicator) between an overall result and an intermediate result, an indication of a relationship between a first intermediate result (e.g., a coarser intermediate result) and a second intermediate result (e.g., a finer intermediate result), or the like. For example, client device 210 may indent an intermediate result under an overall result (e.g., when the intermediate result is used to generate the overall result), may indent a finer intermediate result under a coarser intermediate result (e.g., when the finer intermediate result is used to generate the coarser intermediate result), or the like.

Client device 210 may provide intermediate results for display using a hierarchical tree, in some implementations. The hierarchical tree may provide an indication of independent intermediate operations, independent intermediate results, dependent intermediate operations, and/or dependent intermediate results. For example, client device 210 may display independent intermediate operations (e.g., that may be, but are not necessarily, performed in parallel) on a first level of the tree, and may provide subsequent operations (e.g., that depend on another intermediate operation) on a lower level in the tree. Client device 210 may also provide a dependency indicator that indicates a dependency of a value in a subsequent operation from a result determined in a previous operation.

In this way, a user may adjust intermediate results provided for display by client device 210 to gain an understanding of how a program operates, to debug a program, or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
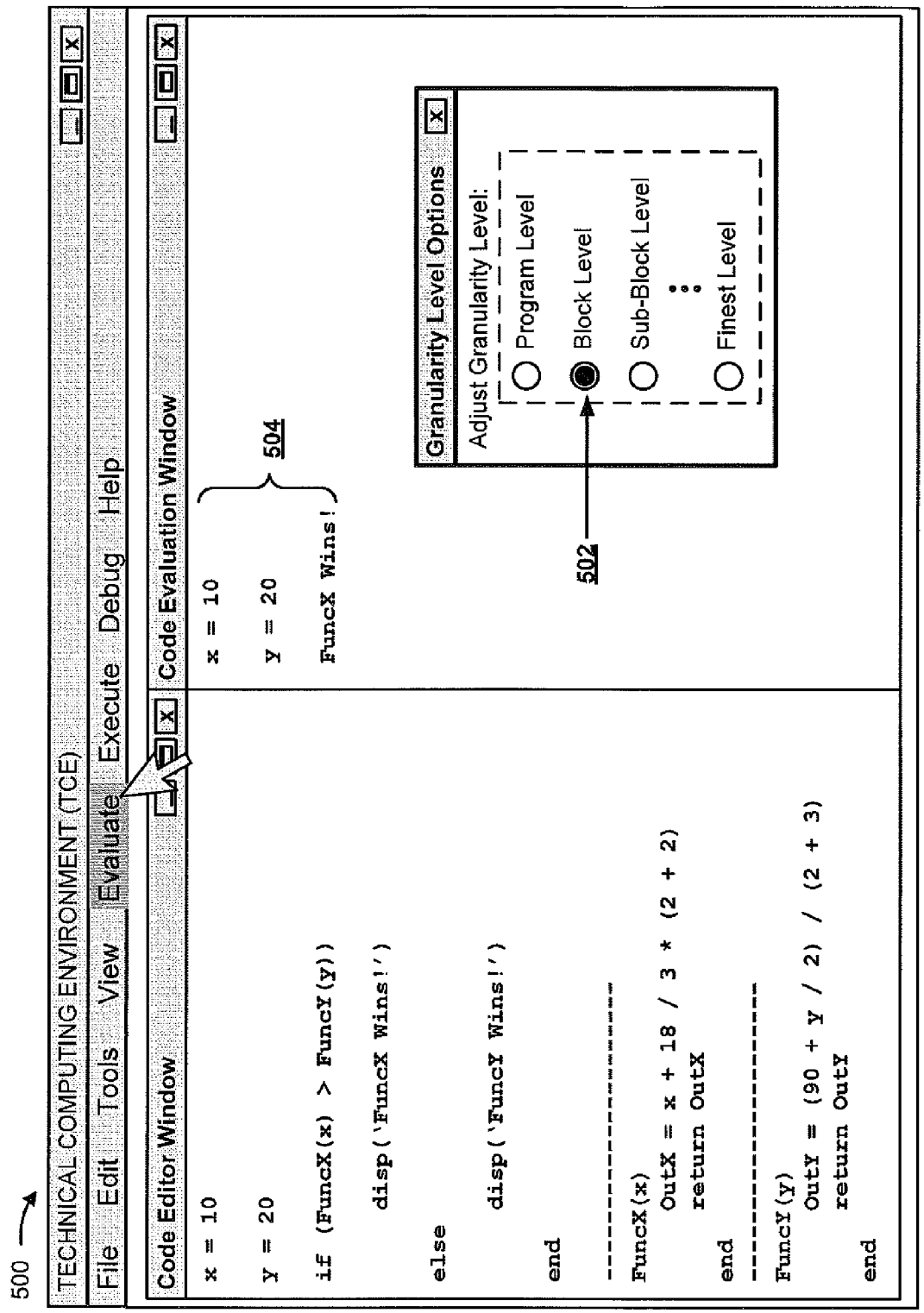
FIGS. 5A-5P are diagrams of an example implementation relating to the example process shown in FIG. 4.
Figure 5B:
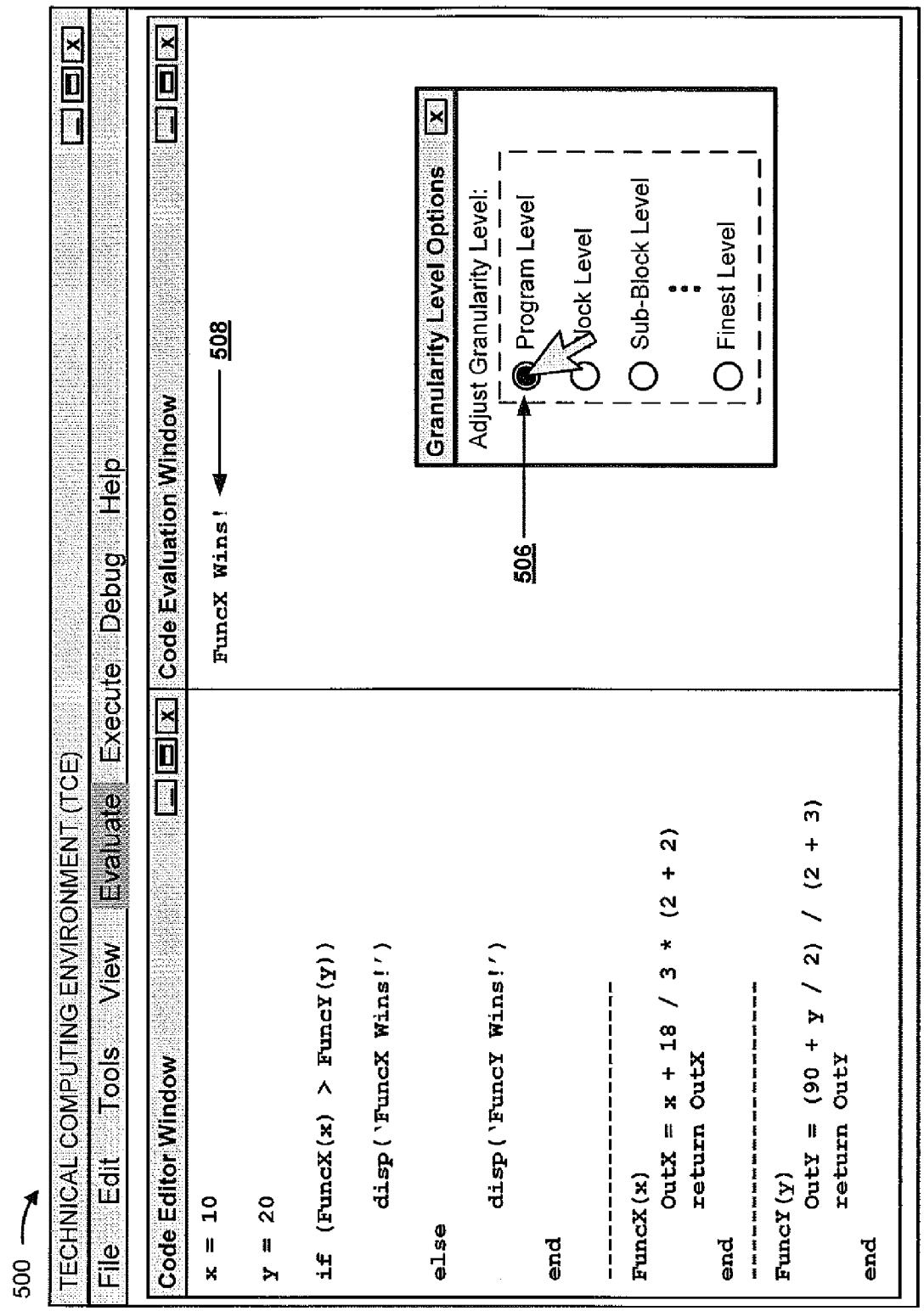
Figure 5C:
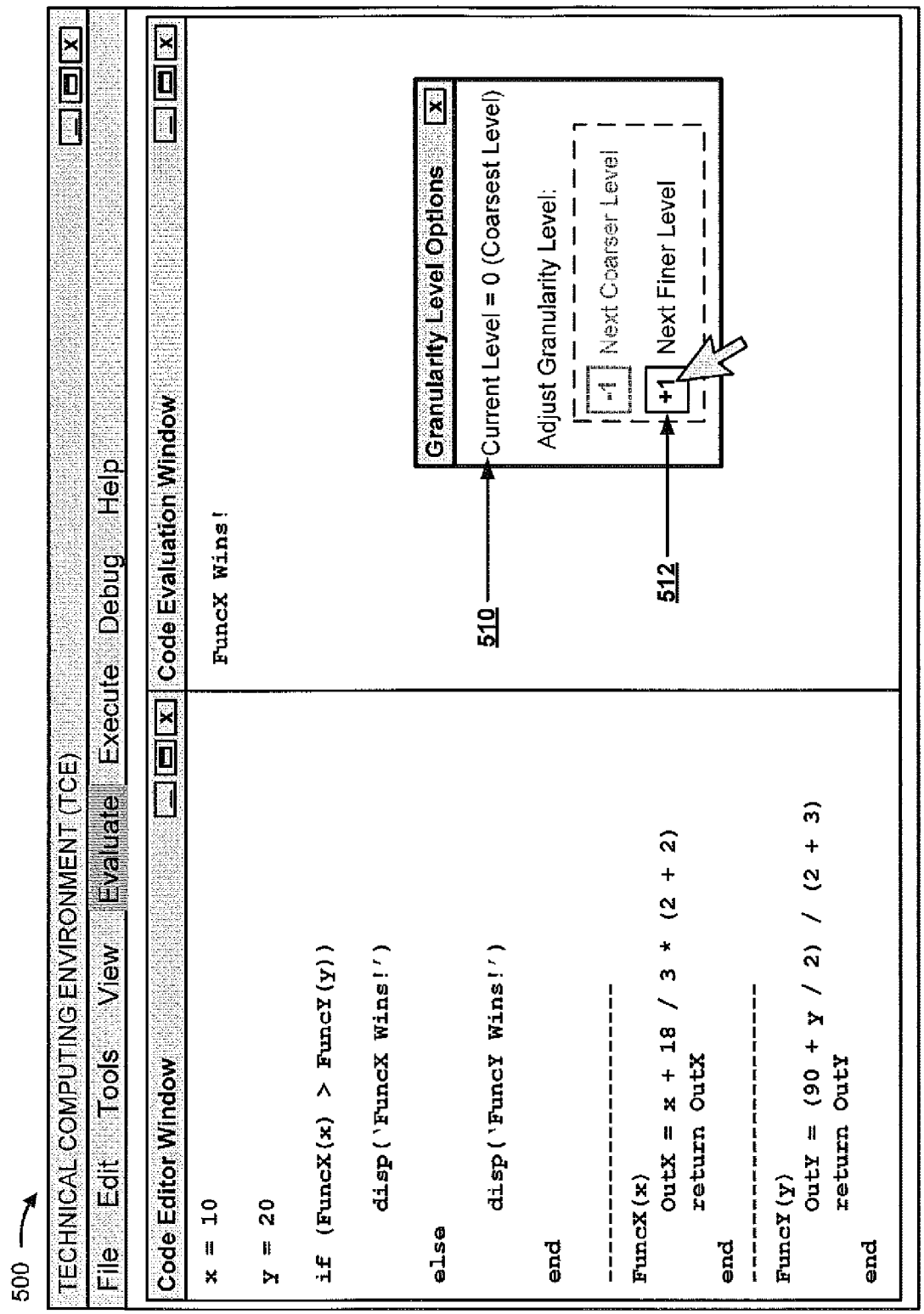
Figure 5M:
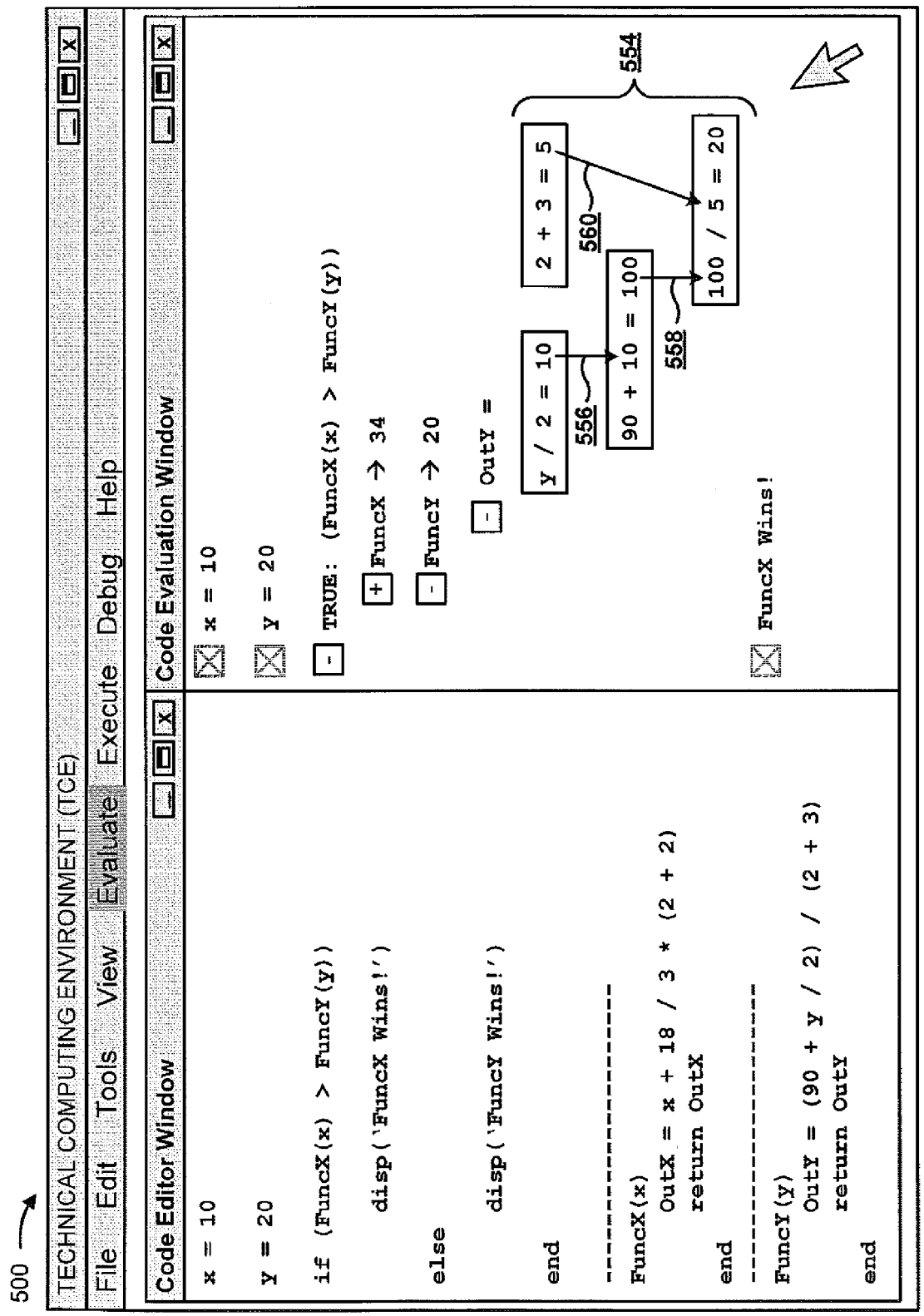
Figure 5N:
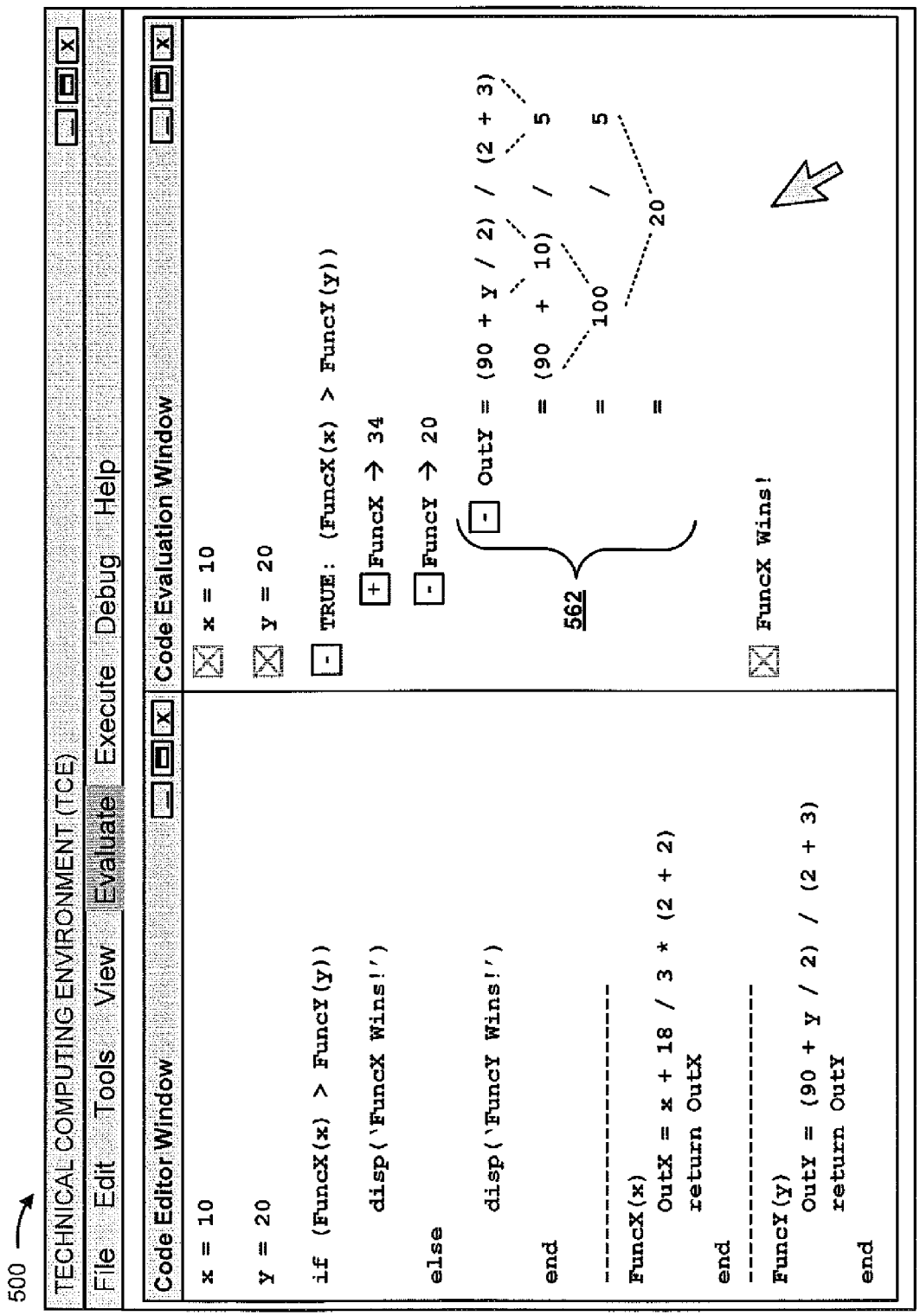
Figure 5P:
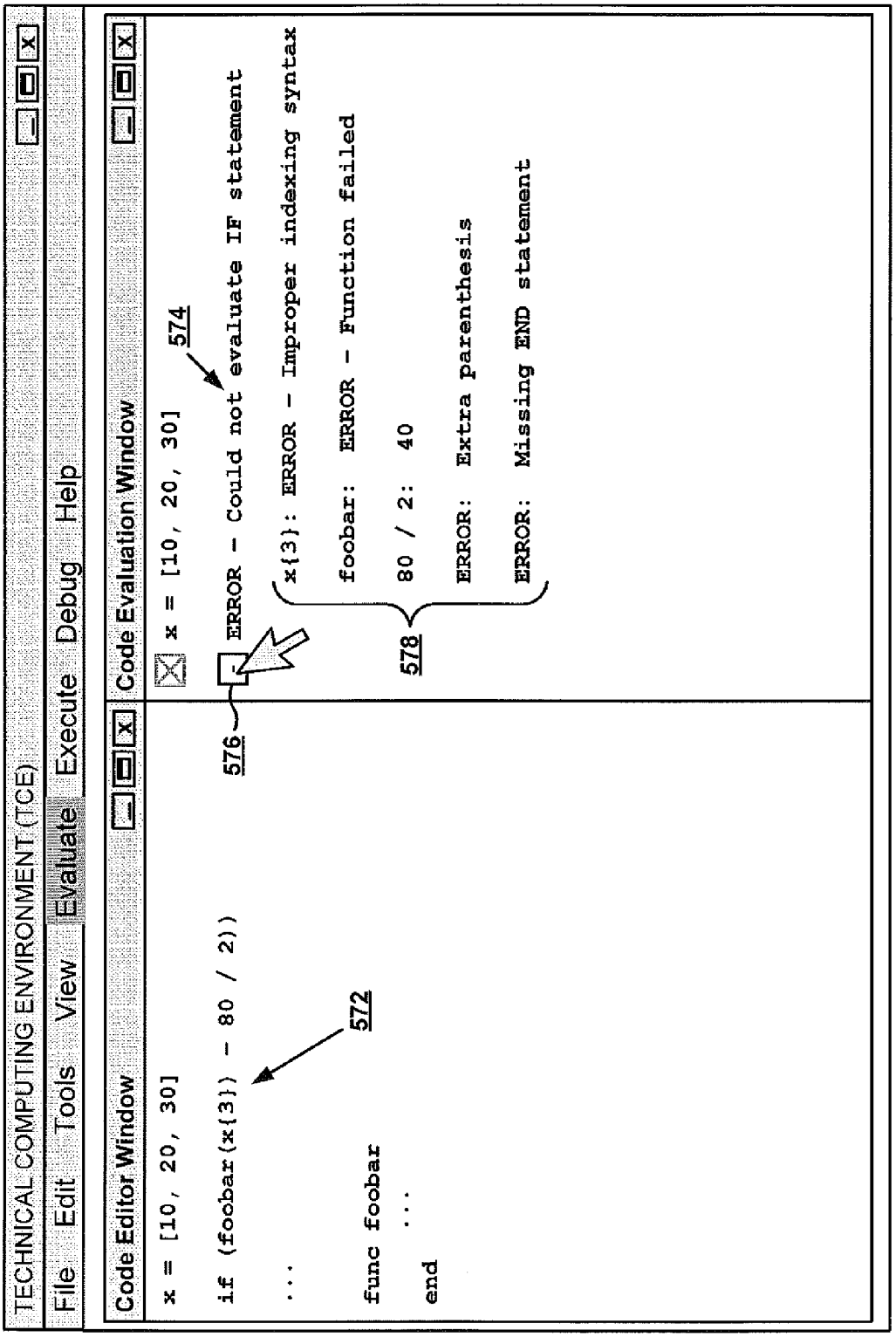

FIGS. 5A-5P are diagrams of an example implementation 500 relating to example process 400 shown in FIG. 4. FIGS. 5A-5P show different examples of providing intermediate results of evaluating program code based on a granularity level.

As shown in FIG. 5A, assume that a user has input the following program code into a code editor window of a user interface of TCE 220:

```
x=10
y=20
if (FuncX(x)>FuncY(y))
    disp('FuncX Wins!')
else
    disp('FuncY Wins!')
end
--------------------
FuncX(x)
    OutX=x+18/3*(2+2)
    return OutX
end
--------------------
FuncY(y)
    OutY=(90+y/2)/(2+3)
    return OutY
end.
```

The above program code specifies a value of a variable x (e.g., x=10), specifies a value of a variable y (e.g., y=20), calculates a first value by applying a first function to the value of x (e.g., FuncX(x)), calculates a second value by applying a second function to the value of y (e.g., FuncY(y)), and compares the first value to the second value (e.g., if (FuncX(x)>FuncY(y))). If the first value is greater than the second value, then the program code outputs a string shown as FuncX Wins!. If the first value is not greater than the second value, then the program code outputs a string shown as FuncY Wins!.

As further shown in FIG. 5A, assume that the user interacts with an input mechanism (e.g., an "Evaluate" button) to cause client device 210 to evaluate the program code shown in the code editor window. Further, assume that the user has selected that intermediate results are to be displayed at the block level of granularity, as shown by reference number 502. Based on the user selection, client device 210 provides results for display corresponding to a first block of code (e.g., x=10), a second block of code (e.g., y=20), and a third block of code (e.g., a conditional IF statement with a result shown as FuncX Wins!), as shown by reference number 504.

As shown in FIG. 5B, and by reference number 506, assume that the user interacts with the input mechanism to select that intermediate results are to be displayed at the program level of granularity (e.g., a granularity level that is coarser than the block level granularity). Based on the user selection, client device 210 provides results for display corresponding to execution of the entire program (e.g., all of the program code), with an overall result shown as FuncX Wins!, as shown by reference number 508. The user may select other pre-defined levels of granularity, such as a sub-block level, a finest level, etc., as shown.

FIG. 5C shows an example of another input mechanism that client device 210 may provide to receive user input specifying a granularity level for displaying intermediate results. As shown by reference number 510, assume that the current granularity level is zero, which represents the coarsest level of granularity (e.g., the program level). As shown by reference number 512, assume that the user interacts with the input mechanism to adjust the granularity level to the next finer level of granularity.

As shown in FIG. 5D, and by reference number 514, the user interaction has adjusted the granularity level to the next finer level, shown as level 1. As shown by reference number 516, client device 210 provides additional results (e.g., intermediate results) based on the user selecting the next finer level of granularity (e.g., a block level). For example, client device 210 provides results for display corresponding to a first block of code (e.g., x=10), a second block of code (e.g., y=20), and a third block of code (e.g., a conditional IF statement with a result shown as FuncX Wins!). As shown by reference number 518, assume that the user again interacts with the input mechanism to adjust the granularity level to the next finer level of granularity.

As shown in FIG. 5E, and by reference number 520, the user interaction has adjusted the granularity level to the next finer level, shown as level 2. As shown by reference number 522, client device 210 provides additional results (e.g., intermediate results) based on the user selecting the next finer level of granularity (e.g., a line level). For example, client device 210 provides an additional result associated with the conditional IF statement, showing that the IF statement evaluated to TRUE, and that the value generated by FuncX(x) is greater than the value generated by FuncY (y). As shown by reference number 524, assume that the user again interacts with the input mechanism to adjust the granularity level to the next finer level of granularity.

As shown in FIG. 5F, and by reference number 526, the user interaction has adjusted the granularity level to the next finer level, shown as level 3. As shown by reference number 528, client device 210 provides additional results (e.g., intermediate results) based on the user selecting the next finer level of granularity (e.g., a sub-line level). For example, client device 210 provides additional results showing that a value of 34 was generated by evaluating FuncX(x), and that a value of 20 was generated by evaluating FuncY (y).

FIG. 5G shows an example of another input mechanism that client device 210 may provide to receive user input specifying a granularity level for displaying intermediate results. As shown by reference number 530, client device 210 may provide an input mechanism to collapse a particular result (e.g., TRUE), and to hide intermediate results used to generate the particular result (e.g., the values generated by evaluating FuncX(x) and FuncY(y)). As shown by reference number 532, client device 210 may provide an input mechanism to expand a particular result (e.g., FuncY), and to show intermediate results used to generate the particular result (e.g., results used to generate a value of 20 for FuncY). As shown by reference number 534, client device 210 may provide a finest level indicator that indicates that a result cannot be further expanded to view intermediate results used to generate the result. As shown in FIG. 5G, assume that the user interacts with an expand button to display intermediate results used to generate the value of 20 for FuncY.

As shown in FIG. 5H, and by reference number 536, client device 210 receives the user interaction with the expand button and provides intermediate results used to generate the value of 20 for FuncY. For example, assume that the last calculation performed by client device 210 to generate the value of 20 is to divide 100 by 5. Client device 210 provides these intermediate results of 100 and 5 (as well as an indication of the divide operator) for display. As shown by reference number 538, these intermediate results may be further expanded, and client device 210 may provide expand buttons associated with each of these intermediate results (e.g., 100 and 5). As shown in FIG. 5H, assume that the user interacts with an expand button to display intermediate results used to generate the value of 100.

As shown in FIG. 5I, and by reference number 540, client device 210 receives the user interaction with the expand button and provides intermediate results used to generate the value of 100. For example, assume that the last calculation performed by client device 210 to generate the value of 100 is to add 90 and 10. Client device 210 provides these intermediate results of 90 and 10 (as well as an indication of the add operator) for display. As shown by reference number 542, the intermediate result of 10 may be further expanded, and client device 210 may provide an expand button associated with the intermediate result of 10. As further shown, the intermediate value of 90 may not be further expanded, and client device 210 may not provide an expand button (and/or may provide a finest level indicator) for the value of 90. The value of 90 may not be expanded because the value corresponds directly to a value provided in the program code (e.g., in the OutY line in the FuncY function). As shown in FIG. 5I, assume that the user interacts with an expand button to display intermediate results used to generate the value of 10.

As shown in FIG. 5J, and by reference number 544, client device 210 receives the user interaction with the expand button and provides intermediate results used to generate the value of 10. For example, assume that the last calculation performed by client device 210 to generate the value of 10 is to divide 20 by 2. Client device 210 provides these intermediate results of 20 and 2 (as well as an indication of the divide operator) for display. As shown by reference number 546, the intermediate result of 20 may be further expanded, and client device 210 may provide an expand button associated with the intermediate result of 20. As further shown, the intermediate value of 2 may not be further expanded, and client device 210 may not provide an expand button (and/or may provide a finest level indicator) for the value of 2. The value of 2 may not be expanded because the value corresponds directly to a value provided in the program code (e.g., in the OutY line in the FuncY function). As shown in FIG. 5J, assume that the user interacts with an expand button to display intermediate results used to generate the value of 20.

As shown in FIG. 5K, and by reference number 548, client device 210 receives the user interaction with the expand button and provides intermediate results used to generate the value of 20. For example, assume that the last calculation performed by client device 210 to generate the value of 20 is to load the value of the variable y from memory. Client device 210 provides the intermediate result of y for display. The value of y may not be expanded because the value corresponds directly to a value provided in the program code (e.g., in the OutY line in the FuncY function). Thus, client device 210 does not provide an expand button for y. As shown by reference number 550, assume that the user interacts with an input mechanism that causes client device 210 to show the steps (e.g., intermediate results and intermediate operations) used to generate the value of OutY.

As shown in FIG. 5L, and by reference number 552, client device 210 receives the user interaction, and provides a list of steps used to generate the value of OutY. The steps may follow a defined order of operations. For example, as shown in step A, client device 210 may first divide the value of y (e.g., 20) by 2 to obtain a value of 10. As shown in step B, client device 210 may add the value of 10 to a value of 90 (e.g., specified in the code) to generate a value of 100. As shown in step C, client device 210 may then add the values of 2 and 3 (e.g., specified in the code) to generate a value of 5. As shown in step D, client device 210 may then divide the generated value of 100 by the generated value of 5 to generate a value of 20 for the variable OutY. Client device 210 may provide an indication of these steps (e.g., intermediate values and/or operations used to generate other intermediate values or an overall value), as shown.

FIG. 5M provides an example of a technique for providing intermediate results for display using a hierarchical tree.

As shown by reference number 554, client device 210 may provide intermediate operations and intermediate results using a hierarchical tree. For example, as shown, client device 210 displays the operations y/2=10 and 2+3=5 on a same line in the tree since these operations are independent (e.g., may be, but are not necessarily, performed in parallel) and do not depend on another operation. As further shown, client device 210 displays the operation 90+10=100 on a second line of the tree, and displays a dependency indicator 556 that indicates that the value of 10 in 90+10=100 is determined in the previous operation y/2=10. As further shown, client device 210 displays the operation 100/5=20 on a third line of the tree, displays a first dependency indicator 558 that indicates that the value of 100 in 100/5=20 is determined in the previous operation 90+10=100, and provides a second dependency indicator 560 that indicates that the value of 5 in 100/5=20 is determined in the previous operation 2+3=5. In this way, a user may be able to easily see how intermediate results affect an overall result. Furthermore, as the user edits the program code, client device 210 may determine changes to the intermediate operations and/or the intermediate results due to the edits to the program code, and may provide the changes via the code editor window.

FIG. 5N shows an example of another technique for providing intermediate results for display. As shown by reference number 562, client device 210 may provide intermediate operations and intermediate results step-by-step. For example, client device 210 shows an expression of OutY equal to (90+y/2)/(2+3), which is the same value shown in the program code. Client device 210 also shows how the expression changes by substituting equivalent values as the intermediate operations are performed. For example, client device 210 calculates a value of y/2=10 (e.g., based on an order of operations), and substitutes the value of 10 for y/2, as shown in the next line in the results, (90+10)/5. Client device 210 continues providing intermediate results in this manner until the final value of OutY (e.g., 20) is shown.

As shown in FIG. 5O, a user may use the provided intermediate results to debug a program. For example, as shown by reference number 564, assume that the user inputs a value of "Hello" (e.g., a string) for the variable y. As shown by reference number 566, this input may cause errors in the program, and client device 210 may provide an error indicator associated with the IF statement (e.g., ERROR— Invalid value of FuncY), and may provide an error indicator associated with a line of code that determines the value generated by evaluating FuncY (e.g., FuncY→ERROR). As shown, client device 210 may provide the value generated by evaluating FuncX since this value is not associated with an error. As shown by reference number 568, client device 210 may provide error indicators for intermediate results associated with an error. As shown by reference number 570, client device 210 may provide intermediate results that are not associated with an error (e.g., 2+3=5). In this way, a user may easily debug the program code by seeing which portions of program code generated an error.

FIG. 5P shows an example of providing intermediate errors and overall errors for display. As shown by reference number 572, assume that the user inputs program code that includes multiple errors, shown as if (foobar(x{3})–80/2)). Assume that this line of code includes four errors: an improper indexing of x, a failure in the foobar function, an extra parenthesis, and a missing END statement. As shown by reference number 574, client device 210 may provide an overall error based on evaluating the line of code, shown as ERROR—Could not evaluate if statement. As shown by reference number 576, assume that a user interacts with an input mechanism to cause client device 210 to provide intermediate errors for display. Client device 210 may provide the input mechanism based on determining that the line of code includes intermediate errors.

As shown by reference number 578, based on the user interaction, client device 210 may provide the intermediate errors, as well as intermediate results that executed properly, for display. For example, client device 210 may provide information identifying the four errors associated with the line of code, and may provide an intermediate operation and an intermediate result, shown as 80/2=40.

As indicated above, FIGS. 5A-5P are provided merely as an example. Other examples are possible and may differ from what was described with regard to FIGS. 5A-5P.

Figure 6:
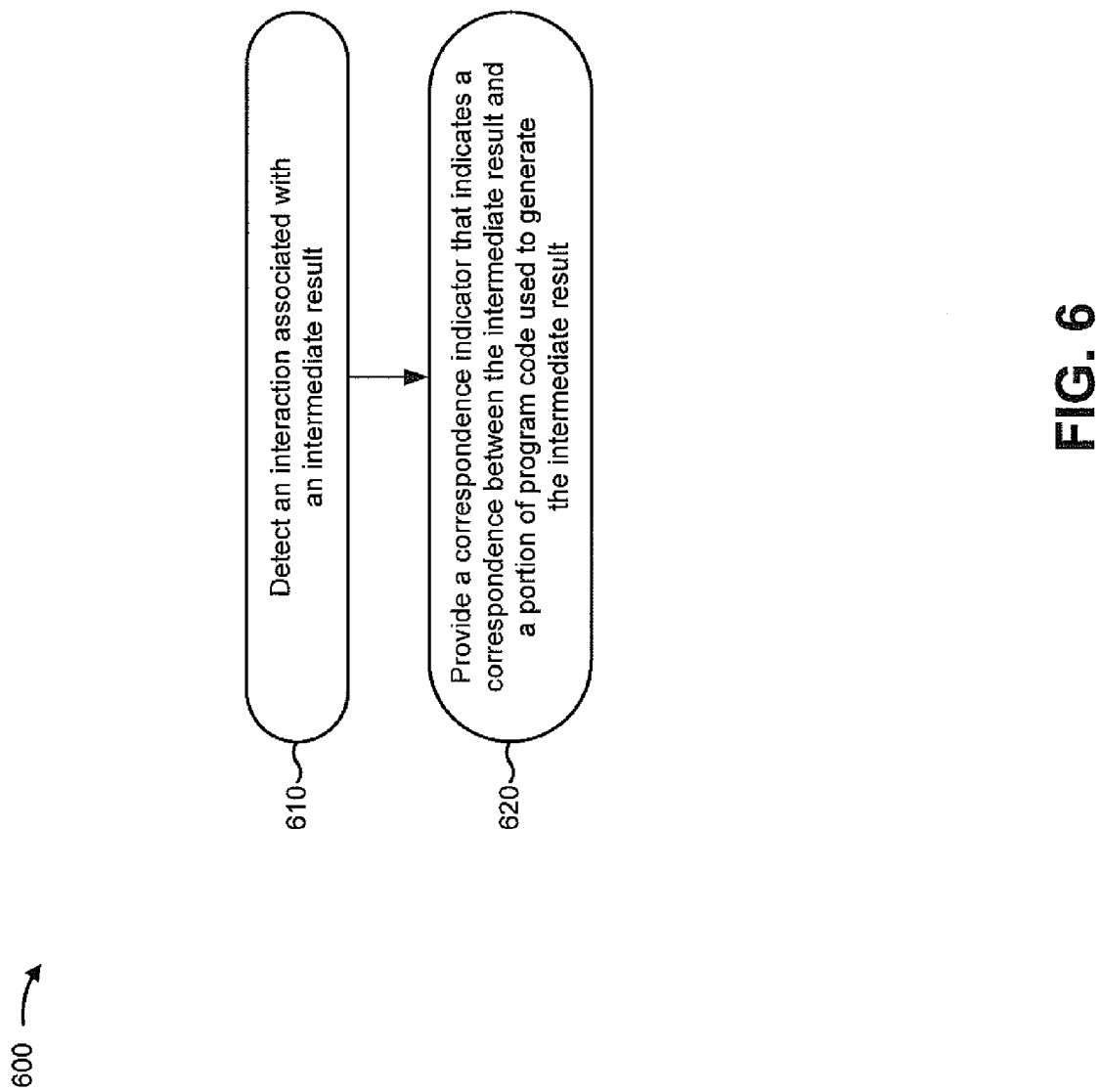
FIG. 6 is a flow chart of an example process for providing an indication of a correspondence between program code and an intermediate result of evaluating the program code.

FIG. 6 is a flow chart of an example process 600 for providing an indication of a correspondence between program code and an intermediate result of evaluating the program code. In some implementations, one or more process blocks of FIG. 6 may be performed by client device 210. In some implementations, one or more process blocks of FIG. 6 may be performed by another device or a group of devices separate from or including client device 210, such as server device 230.

As shown in FIG. 6, process 600 may include detecting an interaction associated with an intermediate result (block 610). For example, client device 210 may detect an interaction (e.g., a user interaction) with an intermediate result displayed in a code evaluation portion of a user interface (e.g., a user interface of TCE 220). Additionally, or alternatively client device 210 may detect an interaction with program code, associated with an intermediate result, displayed in a code editor portion of the user interface.

Client device 210 may detect the interaction based on receiving user input, such as a user selection of a result and/or a portion of program code. For example, a user may click on a result and/or a portion of program code (e.g., may click on a line of code, may click on a function, may click on a block of code, etc.), may use a keyboard to select a result and/or a portion of code (e.g., may navigate to a line of code using an up arrow or a down arrow), may select a result and/or a portion of code using a finger (e.g., via a touch screen), may use a hand gesture to select a result and/or a portion of code (e.g., touching, swiping, pinching, etc.), or the like. In some implementations, the interaction may cause an indicator, such as a cursor (e.g., a text cursor, a mouse cursor, etc.), to be displayed in association with the selected result and/or portion of program code (e.g., within the text of the program code or result, on a selected line of code or a result, etc.).

As further shown in FIG. 6, process 600 may include providing a correspondence indicator that indicates a correspondence between the intermediate result and a portion of program code used to generate the intermediate result (block 620). For example, client device 210 may provide, via a user interface of TCE 220, an indication of a correspondence (e.g., a correspondence indicator) between an intermediate result and a portion of program code used to generate the intermediate result. Client device 210 may provide different correspondence indicators to indicate a correspondence between different intermediate result and different portions of program code used to generate the intermediate results, in some implementations.

Client device 210 may provide the correspondence indicator via the code editor window and/or the code evaluation window, in some implementations. For example, client device 210 may provide a first correspondence indicator related to a particular portion of code, and/or may provide a second correspondence indicator related to a particular result generated by evaluating the particular portion of code. A correspondence indicator may include, for example, highlighting the particular portion of code and the corresponding result (e.g., using a same color), outlining the particular portion of code and the corresponding result (e.g., using a same color, line weight, line style, etc.), marking the particular portion of code and the corresponding result (e.g., using a same number, letter, character, symbol, etc.), or the like.

Additionally, or alternatively, client device 210 may provide the correspondence indicator by aligning the particular portion of code and the corresponding result (e.g., aligning a top boundary of the portion of code with a top boundary of the result, aligning a bottom boundary of the portion of code with a bottom boundary of the result, aligning a center, such as a vertical or horizontal center, of the portion of code with a center of the result, aligning a top boundary with a vertical center, aligning a bottom boundary with a vertical center, etc.). Additionally, or alternatively, client device 210 may provide multiple results, in the code evaluation window, in the same order that respective multiple portions of program code, used to generate the multiple results, are provided in the code editor window.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

FIGS. 7A-7F are diagrams of an example implementation 700 relating to example process 600 shown in FIG. 6. FIGS. 7A-7F show examples of providing correspondence indicators between intermediate results and respective portions of program code used to generate the intermediate results.

As shown in FIG. 7A, and by reference number 705, assume that a user interacts with an intermediate result shown as TRUE: (FuncX(x)>FuncY(y)). For example, the user may click on the intermediate result. Based on the user interaction with this intermediate result, client device 210 provides a correspondence indicator as a gray highlighting of the intermediate result and a gray highlighting of program code used to generate the intermediate result (e.g., if (FuncX(x)>FuncY(y))), as shown by reference number 710.

As shown in FIG. 7B, and by reference number 715, assume that the user interacts with a different intermediate result, shown as FuncY 20. Based on the user interaction with this intermediate result, client device 210 highlights the result. Further, as shown by reference number 720, client device 210 highlights two portions of program code that correspond to this result, shown as a portion of the IF statement (e.g., FuncY(y)) and the program code included in the function FuncY(y) used to generate the value of FuncY (y). As this example shows, client device 210 may provide a correspondence indicator that identifies multiple portions of program code associated with a particular intermediate result.

As shown in FIG. 7C, and by reference number 725, assume that the user interacts with an intermediate result shown as y/2=10. Based on this user interaction, client device 210 highlights a portion of a line of program code, shown as y/2, that corresponds to this intermediate result, as shown by reference number 730. As this example shows, client device 210 may provide a correspondence indicator that identifies a portion of a line of program code that corresponds to a particular intermediate result.

As shown in FIG. 7D, and by reference number 735, assume that the user interacts with an intermediate result shown as 100/5=20. Based on this user interaction, client device 210 highlights a portion of a line of program code, shown as (90+y/2)/(2+3), which is used to generate this intermediate result, as shown by reference number 740.

As shown in FIG. 7E, and by reference number 745, assume that the user interacts with a portion of program code rather than interacting with a result. For example, assume that the user interacts with a line of program code used to calculate the value of OutY. As shown by reference number 750, client device 210 may highlight intermediate results that correspond to this selected portion of program code.

FIG. 7F show an example where client device 210 uses different correspondence indicators to indicate correspondences between different intermediate result and different portions of program code used to generate the intermediate results. For example, step A (e.g., y/2=10) is highlighted in light gray, as is the program code shown as y/2. Step B (e.g., 90+10=100) is outlined using a dotted line, as is the program code shown as (90+y/2). Step C (e.g., 2+3=5) is highlighted in dark gray, as is the program code shown as (2+3). Step D (e.g., 100/5=20) is outlined using a dashed line, as is the program code shown as (90+y/2)/(2+3). As shown, a single portion of program code may be indicated by multiple correspondence indicators.

As indicated above, FIGS. 7A-7F are provided merely as an example. Other examples are possible and may differ from what was described with regard to FIGS. 7A-7F.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Also, as used herein, the term "set" is intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:

1. A computer-readable medium storing instructions, the instructions comprising:
one or more instructions that, when executed by one or more processors, cause the one or more processors to:
evaluate a first portion of program code to generate an overall result,
the overall result being a result of evaluating the first portion of program code;
determine an intermediate result based on evaluating the first portion of program code,
the intermediate result being used to generate the overall result of evaluating the first portion of program code, and
the intermediate result being determined by evaluating a second portion of program code associated with the first portion of program code;
receive information that identifies a granularity level for displaying the intermediate result,
the granularity level indicating whether to provide the intermediate result for display; and
selectively provide the intermediate result for display based on the granularity level.

2. The computer-readable medium of claim 1, where the second portion of program code is included in the first portion of program code.

3. The computer-readable medium of claim 1, where the second portion of program code is a sub-portion of the first portion of program code.

4. The computer-readable medium of claim 1, where the one or more instructions, that cause the one or more processors to determine the intermediate result, further cause the one or more processors to:
determine a first intermediate result used to generate the overall result;
determine a second intermediate result used to generate the overall result; and
where the one or more instructions, that cause the one or more processors to selectively provide the intermediate result for display, further cause the one or more processors to:
show the first intermediate result based on the granularity level; and
hide the second intermediate result based on the granularity level.

5. The computer-readable medium of claim 1, where the one or more instructions further cause the one or more processors to:
provide a correspondence indicator that indicates a correspondence between the intermediate result and the second portion of program code.

6. The computer-readable medium of claim 1, where the intermediate result is associated with a plurality of intermediate processing steps used to generate the overall result; and
where the one or more instructions, that cause the one or more processors to selectively provide the intermediate result for display, further cause the one or more processors to:
provide, for display, information relating to the plurality of intermediate processing steps.

7. The computer-readable medium of claim 1, where the one or more instructions further cause the one or more processors to:
provide the first portion of program code and the second portion of program code for display via a first section of a user interface; and
where the one or more instructions, that cause the one or more processors to selectively provide the intermediate result for display, further cause the one or more processors to:
provide the intermediate result for display via a second section of the user interface,
the second section being separate from the first section.

8. A device, comprising:
one or more processors to:
cause execution of a first portion of program code to generate an overall result;
determine a plurality of intermediate results, used to generate the overall result, based on causing execution the first portion of program code,
the plurality of intermediate results being determined by executing a second portion of program code associated with the first portion of program code, and
the second portion of program code being different from the first portion of program code;
receive an indication to provide at least one intermediate result, of the plurality of intermediate results, for display; and
selectively provide the at least one intermediate result for display based on receiving the indication to provide the at least one intermediate result for display.

9. The device of claim 8, where the second portion of program code is included in the first portion of program code.

10. The device of claim 8, where the one or more processors, when determining the plurality of intermediate results, are to:
determine a first intermediate result used to generate the overall result;
determine a second intermediate result used to generate the first intermediate result; and
where the one or more processors, when selectively providing the at least one intermediate result for display, are to:
show the first intermediate result via a user interface; and
hide the second intermediate result from the user interface.

11. The device of claim 8, where the one or more processors, when determining the plurality of intermediate results, are further to:
determine a first intermediate result used to generate the overall result;
determine a second intermediate result used to generate the first intermediate result; and
where the one or more processors, when selectively providing the at least one intermediate result for display, are to:
show the second intermediate result via a user interface; and
hide the first intermediate result from the user interface.

12. The device of claim 8, where the one or more processors, when determining the plurality of intermediate results, are to:
determine a first intermediate result used to generate the overall result;
determine a second intermediate result used to generate the first intermediate result; and where the one or more processors, when selectively providing the at least one intermediate result for display, are to:
provide the first intermediate result and the second intermediate result for display.

13. The device of claim 8, where the one or more processors are further to:
receive information that identifies a granularity level that controls whether intermediate results, of the plurality of intermediate results, are provided for display; and
modify a quantity of intermediate results provided for display based on the granularity level.

14. A method, comprising:
evaluating a first portion of program code to generate an overall result associated with the first portion of program code,
the evaluating being performed by one or more devices;
identifying an intermediate result used to generate the overall result associated with the first portion of program code,
the intermediate result being determined based on evaluating a second portion of program code that is different from the first portion of program code, and
the identifying the intermediate result being performed by the one or more devices;
receiving information that identifies a granularity level for providing the intermediate result for display,
the granularity level indicating whether to provide the intermediate result for display, and
the receiving the information being performed by the one or more devices; and
selectively providing the intermediate result for display based on the granularity level,
the selectively providing being performed by the one or more devices.

15. The method of claim 14, where the second portion of program code is included in the first portion of program code.

16. The method of claim 14, where the second portion of program code is a sub-portion of the first portion of program code.

17. The method of claim 14, where selectively providing the intermediate result comprises:
providing the intermediate result for display in place of the overall result.

18. The method of claim 14, where identifying the intermediate result comprises:
identifying a first intermediate result used to generate the overall result;
identifying a second intermediate result used to generate the first intermediate result; and
where selectively providing the intermediate result for display comprises:
show the first intermediate result for display based on the granularity level; and
hide the second intermediate result from being displayed based on the granularity level.

19. The method of claim 14, further comprising:
providing, for display, an indication of a relationship between the intermediate result and the overall result.

20. The method of claim 14, where the intermediate result includes a plurality of intermediate processing steps used to generate the overall result; and
where selectively providing the intermediate result for display comprises:
providing, for display, information relating to the plurality of intermediate processing steps.

* * * * *